US012812543B2

(12) United States Patent
Elazzouni et al.

(10) Patent No.: US 12,812,543 B2
(45) Date of Patent: Nov. 24, 2026

(54) TECHNIQUES FOR CELL DISCONTINUOUS RECEPTION AND DISCONTINUOUS TRANSMISSION STATE ACTIVATION

(71) Applicant: QUALCOMM Incorporated, San Diego, CA (US)

(72) Inventors: Sherif Elazzouni, San Diego, CA (US); Hung Dinh Ly, San Diego, CA (US); Wanshi Chen, San Diego, CA (US); Navid Abedini, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 202 days.

(21) Appl. No.: 18/666,445

(22) Filed: May 16, 2024

(65) Prior Publication Data

US 2024/0389026 A1 Nov. 21, 2024

Related U.S. Application Data

(60) Provisional application No. 63/503,402, filed on May 19, 2023.

(51) Int. Cl.
*H04W 52/02* (2009.01)
*H04W 72/232* (2023.01)
(Continued)

(52) U.S. Cl.
CPC ..... *H04W 52/0235* (2013.01); *H04W 72/232* (2023.01); *H04W 76/28* (2018.02); *H04W 80/02* (2013.01)

(58) Field of Classification Search
CPC ........... H04W 52/0235; H04W 72/232; H04W 76/28; H04W 80/02; H04W 72/23;
(Continued)

(56) References Cited

U.S. PATENT DOCUMENTS

| | | | | |
|---|---|---|---|---|
| 2011/0116427 A1* | 5/2011 | Chang | ............... | H04W 52/0216 370/311 |
| 2017/0202052 A1* | 7/2017 | Xu | ...................... | H04W 72/541 |

(Continued)

FOREIGN PATENT DOCUMENTS

| | | |
|---|---|---|
| EP | 3154308 A1 | 4/2017 |
| WO | WO-2022083418 A1 | 4/2022 |

OTHER PUBLICATIONS

Augustyniak M., et al: "Discussion on cell DTX/DRX", R2-2300230, Type Discussion, Netw Energy NR, 3rd Generation Partnership Project, Mobile Competence Centre, 650, Route Des Lucioles, F-06921 Sophia-Antipolis Cedex, France, vol. 3GPP RAN 2, No. Athens, Feb. 27, 2023-Mar. 3, 2023, Feb. 17, 2023, XP052244880, retrieved on Feb. 17, 2023, paragraphs [0001], [02.2], [02.3], 6 Pages.

(Continued)

*Primary Examiner* — Nimesh Patel
(74) *Attorney, Agent, or Firm* — Holland & Hart LLP/QUALCOMM Incorporated

(57) ABSTRACT

Methods, systems, and devices for wireless communications are described. A network entity may identify at a first cell of the network entity, an energy savings configuration for a set of cells associated with the network entity. The energy savings configuration may include a respective discontinuous transmission (DTX) activation state for one or more cells of the set of cells, a discontinuous reception (DRX) activation state for the one more cells of the set of cells, or both. The network entity may transmit, to a set of user equipments (UEs), control signaling that indicates an energy savings activation state for the one or more cells of the set of cells based on the energy savings configuration. The network entity may communicate, via the set of cells, with (Continued)

one or more UEs of the set of UEs in accordance with the energy savings activation state.

30 Claims, 19 Drawing Sheets

(51) Int. Cl.
*H04W 76/28* (2018.01)
*H04W 80/02* (2009.01)

(58) Field of Classification Search
CPC ......... H04W 52/0216; H04W 52/0206; H04W 24/10; H04W 72/231; H04W 76/27; H04W 72/21; H04W 72/0446; H04W 48/12; H04W 72/20; H04W 72/1268; H04W 72/12; H04W 72/51; H04W 72/046; H04W 36/0072; H04W 72/1273; H04W 36/165; H04W 16/28; H04W 72/40; Y02D 30/70; Y02D 30/00; H04L 5/0053; H04L 5/0048; H04L 1/1812; H04L 5/0055; H04L 5/001; H04L 1/1854; H04L 1/1887; H04L 5/1469; H04L 1/188; H04L 5/0005; H04L 5/0023; H04L 41/16; H04L 5/0035; H04L 41/0833; H04B 7/0626; H04B 7/06952; H04B 7/0452; H04B 7/088; H04B 7/0617; H04B 1/1615; H04B 17/328; H04B 7/0413; H04B 7/0695; H04B 7/15528; H04B 7/0408; H04B 7/18519; H04B 7/18532; G06N 20/00; G06N 3/0464; G06N 3/02
See application file for complete search history.

(56) References Cited

U.S. PATENT DOCUMENTS

2022/0201516 A1* 6/2022 Guo ...................... H04W 24/08
2022/0232663 A1* 7/2022 Koskinen .......... H04W 52/0229
2023/0138190 A1* 5/2023 Zhang ............... H04W 52/0206
370/311

OTHER PUBLICATIONS

International Search Report and Written Opinion—PCT/US2024/029940—ISA/EPO—Oct. 10, 2024.

* cited by examiner

TECHNIQUES FOR CELL DISCONTINUOUS RECEPTION AND DISCONTINUOUS TRANSMISSION STATE ACTIVATION

CROSS REFERENCE

The present application for patent claims the benefit of U.S. Provisional Patent Application No. 63/503,402 by ELAZZOUNI et al., entitled "TECHNIQUES FOR CELL DISCONTINUOUS RECEPTION AND DISCONTINUOUS TRANSMISSION STATE ACTIVATION," filed May 19, 2023, assigned to the assignee hereof, and expressly incorporated by reference herein.

FIELD OF TECHNOLOGY

The following relates to wireless communications, including techniques for cell discontinuous reception (DRX) and discontinuous transmission (DTX) state activation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support techniques for cell discontinuous reception (DRX) and discontinuous transmission (DTX) state activation. For example, the described techniques provide for provide mechanisms for informing a set of user equipments (UEs) whether one or more cells of a network entity are active or inactive during one or more discontinuous cycles of the network entity. For example, a first cell of the network entity may transmit to a set of UEs control signaling that indicates an energy savings configuration for a one or more discontinuous cycles of the cell. The energy saving configuration may include a DTX activation state of the first cell (e.g., whether DTX is activated or deactivated for a cell), a DRX activation state of the first cell (e.g., whether DRX is activated or deactivated for a cell), or both for one or more discontinuous cycles. Additionally, or alternatively, the first cell may indicate respective DTX and DRX activation states for neighboring cells of the network entity. That is, a single energy savings configuration message may indicate to multiple UEs, a respective DTX/DRX activation states for multiple cells associated with the network entity. In some examples, the network entity may receive acknowledgment messages from each of the UEs indicating that the UEs activated or deactivated communications with one or more of the cells in accordance with the energy savings configuration.

A method for wireless communications at a UE is described. The method may include receiving, from a first activated cell of a network entity, control signaling that indicates an energy savings configuration for discontinuous cycles for one or more second cells of the network entity, the energy savings configuration including a DTX activation state for each cell of the one or more second cells, a DRX activation state for each cell of the one or more second cells, or both, transmitting, to the first activated cell of the network entity, an acknowledgment message indicating which cells of the one or more second cells have been activated or deactivated in accordance with the energy savings configuration, and communicating with the one or more second cells during the discontinuous cycles in accordance with the energy savings configuration.

An apparatus for wireless communications at a UE is described. The apparatus may include at least one processor, at least one memory coupled with the at least one processor, and instructions stored in the at least one memory. The instructions may be executable by the at least one processor to cause the apparatus to receive, from a first activated cell of a network entity, control signaling that indicates an energy savings configuration for discontinuous cycles for one or more second cells of the network entity, the energy savings configuration including a DTX activation state for each cell of the one or more second cells, a DRX activation state for each cell of the one or more second cells, or both, transmit, to the first activated cell of the network entity, an acknowledgment message indicating which cells of the one or more second cells have been activated or deactivated in accordance with the energy savings configuration, and communicate with the one or more second cells during the discontinuous cycles in accordance with the energy savings configuration.

Another apparatus for wireless communications at a UE is described. The apparatus may include means for receiving, from a first activated cell of a network entity, control signaling that indicates an energy savings configuration for discontinuous cycles for one or more second cells of the network entity, the energy savings configuration including a DTX activation state for each cell of the one or more second cells, a DRX activation state for each cell of the one or more second cells, or both, means for transmitting, to the first activated cell of the network entity, an acknowledgment message indicating which cells of the one or more second cells have been activated or deactivated in accordance with the energy savings configuration, and means for communicating with the one or more second cells during the discontinuous cycles in accordance with the energy savings configuration.

A non-transitory computer-readable medium storing code for wireless communications at a UE is described. The code may include instructions executable by a processor to receive, from a first activated cell of a network entity, control signaling that indicates an energy savings configuration for discontinuous cycles for one or more second cells of the network entity, the energy savings configuration including a DTX activation state for each cell of the one or more second cells, a DRX activation state for each cell of the one or more second cells, or both, transmit, to the first activated cell of the network entity, an acknowledgment message indicating which cells of the one or more second cells have been activated or deactivated in accordance with the energy savings configuration, and communicate with the one or more second cells during the discontinuous cycles in accordance with the energy savings configuration.

In some examples of the method, apparatuses, and non-transitory computer-readable medium described herein, the acknowledgment message includes a hybrid automatic repeat request (HARQ) and a process number of the HARQ indicates which cells of the one or more second cells may have been activated or deactivated in accordance with the energy savings configuration.

Some examples of the method, apparatuses, and non-transitory computer-readable medium described herein may further include operations, features, means, or instructions for transmitting the acknowledgment message includes transmitting, as part of the acknowledgment message, a medium access control-control element (MAC-CE) including a cell map that indicates which cells of the one or more second cells may have been activated or deactivated in accordance with the energy savings configuration.

Some examples of the method, apparatuses, and non-transitory computer-readable medium described herein may further include operations, features, means, or instructions for receiving, from the first activated cell, a request to transmit the MAC-CE including the cell map, where transmitting the MAC-CE including the cell map that indicates which cells of the one or more second cells may have been activated or deactivated may be based on receiving the request.

A method for wireless communications at a network entity is described. The method may include identifying an energy savings configuration for a discontinuous cycle of a cell associated with the network entity, the energy savings configuration including a DTX activation state of the cell, a DRX activation state of the cell, or both for the discontinuous cycle, transmitting, to a set of UEs, control signaling that indicates the energy savings configuration for the discontinuous cycle, and communicating, during the discontinuous cycle, with one or more user equipments (UEs) of the set of UEs in accordance with the energy savings configuration.

A network entity for wireless communications is described. The network entity may include one or more memories storing processor executable code, and one or more processors coupled with the one or more memories. The one or more processors may individually or collectively be operable to execute the code to cause the network entity to identify an energy savings configuration for a discontinuous cycle of a cell associated with the network entity, the energy savings configuration including a DTX activation state of the cell, a DRX activation state of the cell, or both for the discontinuous cycle, transmit, to a set of UEs, control signaling that indicates the energy savings configuration for the discontinuous cycle, and communicating, during the discontinuous cycle, with one or more UEs of the set of UEs in accordance with the energy savings configuration.

Another network entity for wireless communications is described. The network entity may include means for identifying an energy savings configuration for a discontinuous cycle of a cell associated with the network entity, the energy savings configuration including a DTX activation state of the cell, a DRX activation state of the cell, or both for the discontinuous cycle, means for transmitting, to a set of UEs, control signaling that indicates the energy savings configuration for the discontinuous cycle, and means for communicating, during the discontinuous cycle, with one or more UEs of the set of UEs in accordance with the energy savings configuration.

A non-transitory computer-readable medium storing code for wireless communications is described. The code may include instructions executable by one or more processors to identify an energy savings configuration for a discontinuous cycle of a cell associated with the network entity, the energy savings configuration including a DTX activation state of the cell, a DRX activation state of the cell, or both for the discontinuous cycle, transmit, to a set of UEs, control signaling that indicates the energy savings configuration for the discontinuous cycle, and communicating, during the discontinuous cycle, with one or more UEs of the set of UEs in accordance with the energy savings configuration.

In some examples of the method, network entities, and non-transitory computer-readable medium described herein, transmitting the control signaling may include operations, features, means, or instructions for indicating, via a downlink control information (DCI) of a power saving monitoring procedure, the energy savings configuration for the discontinuous cycle prior to the discontinuous cycle.

In some examples of the method, network entities, and non-transitory computer-readable medium described herein, transmitting the control signaling may include operations, features, means, or instructions for transmitting, as part of the control signaling, an energy saving radio network temporary identifier (ES-RNTI) that may be associated with each UE of the set of UEs.

In some examples of the method, network entities, and non-transitory computer-readable medium described herein, the set of UEs include separate subsets of UEs and the method, network entities, and non-transitory computer-readable medium may include further operations, features, means, or instructions for transmitting, as part of the ES-RNTI, a respective UE group indicator for each respective subset of UEs, where a given UE group indicator includes at least a timing offset for the respective subset of UEs, the timing offset indicating a duration of time after a start of the discontinuous cycle for the respective subset of UEs to wait before communicating with the cell.

In some examples of the method, network entities, and non-transitory computer-readable medium described herein, each respective UE group indicator further includes an activation status of the respective subset of UEs, a duration of the activation status, and a periodicity associated with activation of the respective subset of UEs.

In some examples of the method, network entities, and non-transitory computer-readable medium described herein, the respective subsets of UEs and the respective UE group indicators may be based on the energy savings configuration.

In some examples of the method, network entities, and non-transitory computer-readable medium described herein, transmitting the control signaling may include operations, features, means, or instructions for transmitting, as part of the control signaling, an indication for the set of UEs to apply a cell DTX cycle or a cell DRX cycle for the discontinuous cycle.

In some examples of the method, network entities, and non-transitory computer-readable medium described herein, transmitting the control signaling may include operations, features, means, or instructions for transmitting, as part of the control signaling, an indication for a duration of the discontinuous cycle.

Some examples of the method, network entities, and non-transitory computer-readable medium described herein may further include operations, features, means, or instructions for transmitting second control signaling deactivating the energy savings configuration, where the energy savings configuration may be applied for the set of UEs until transmitting the second control signaling.

In some examples of the method, network entities, and non-transitory computer-readable medium described herein, transmitting the control signaling may include operations, features, means, or instructions for transmitting, as part of the control signaling, an indication of whether channel state information reporting at the set of UEs may be activated or deactivated during a quantity of discontinuous cycles that includes the discontinuous cycle.

In some examples of the method, network entities, and non-transitory computer-readable medium described herein, transmitting the control signaling may include operations, features, means, or instructions for transmitting, as part of the control signaling, an indication of whether reference signal received power reporting at the set of UEs may be activated or deactivated during a quantity of discontinuous cycles that includes the discontinuous cycle.

In some examples of the method, network entities, and non-transitory computer-readable medium described herein, the control signaling may be DCI of format 2_6.

A method for wireless communications at a network entity is described. The method may include identifying, at a first cell of the network entity, an energy savings configuration for a set of cells associated with the network entity, the energy savings configuration including a respective DTX activation state for one or more cells of the set of cells, a DRX activation state for the one more cells of the set of cells, or both, transmitting, to a set of UEs, control signaling that indicates an energy savings activation state for the one or more cells of the set of cells based on the energy savings configuration, and communicating, via the set of cells, with one or more UEs of the set of UEs in accordance with the energy savings activation state.

A network entity for wireless communications is described. The network entity may include one or more memories storing processor executable code, and one or more processors coupled with the one or more memories. The one or more processors may individually or collectively be operable to execute the code to cause the network entity to identify, at a first cell of the network entity, an energy savings configuration for a set of cells associated with the network entity, the energy savings configuration including a respective DTX activation state for one or more cells of the set of cells, a DRX activation state for the one more cells of the set of cells, or both, transmit, to a set of UEs, control signaling that indicates an energy savings activation state for the one or more cells of the set of cells based on the energy savings configuration, and communicating, via the set of cells, with one or more UEs of the set of UEs in accordance with the energy savings activation state.

Another network entity for wireless communications is described. The network entity may include means for identifying, at a first cell of the network entity, an energy savings configuration for a set of cells associated with the network entity, the energy savings configuration including a respective DTX activation state for one or more cells of the set of cells, a DRX activation state for the one more cells of the set of cells, or both, means for transmitting, to a set of UEs, control signaling that indicates an energy savings activation state for the one or more cells of the set of cells based on the energy savings configuration, and means for communicating, via the set of cells, with one or more UEs of the set of UEs in accordance with the energy savings activation state.

A non-transitory computer-readable medium storing code for wireless communications is described. The code may include instructions executable by one or more processors to identify, at a first cell of the network entity, an energy savings configuration for a set of cells associated with the network entity, the energy savings configuration including a respective DTX activation state for one or more cells of the set of cells, a DRX activation state for the one more cells of the set of cells, or both, transmit, to a set of UEs, control signaling that indicates an energy savings activation state for the one or more cells of the set of cells based on the energy savings configuration, and communicating, via the set of cells, with one or more UEs of the set of UEs in accordance with the energy savings activation state.

In some examples of the method, network entities, and non-transitory computer-readable medium described herein, transmitting the control signaling may include operations, features, means, or instructions for transmitting, as part of the control signaling, a respective cell ID for each cell of the set of cells, where the respective DTX activation state and the respective DRX activation state for a given cell of the set of cells corresponds to the respective cell ID of the given cell.

In some examples of the method, network entities, and non-transitory computer-readable medium described herein, a system information block includes each respective cell ID, each respective DTX activation state, and each respective DRX activation state.

Some examples of the method, network entities, and non-transitory computer-readable medium described herein may further include operations, features, means, or instructions for transmitting, to the set of UEs, one or more control messages indicating a cell bit map, where each bit of the cell bit map may be associated with a DTX activation state of a given cell of the one or more cells, a DRX activation state of the given cell, or both, where the control signaling includes the cell bit map.

In some examples of the method, network entities, and non-transitory computer-readable medium described herein, transmitting the one or more control messages may include operations, features, means, or instructions for transmitting, to the set of UEs via broadcast, a radio resource control (RRC) message indicating the cell bit map.

In some examples of the method, network entities, and non-transitory computer-readable medium described herein, transmitting the one or more control messages may include operations, features, means, or instructions for transmitting, via unicast, a respective MAC-CE message to each UE of the set of UEs, where each respective MAC-CE message includes the cell bit map.

In some examples of the method, network entities, and non-transitory computer-readable medium described herein, transmitting the control signaling may include operations, features, means, or instructions for transmitting a respective set of bits associated with each respective frequency, where a first bit for a given set of bits indicates a DTX activation state of an associated frequency, and a second bit of the given set of bits indicates a DRX activation state of the associated frequency.

In some examples of the method, network entities, and non-transitory computer-readable medium described herein, each cell of the one or more cells may be associated with a respective frequency and the method, network entities, and non-transitory computer-readable medium may include further operations, features, means, or instructions for transmitting, to the set of UEs, a RRC message indicating a frequency bit map, where each bit of the frequency bit map may be associated with a DTX activation state of a given cell of the one or more cells, a DRX activation state of the given cell, or both, where the control signaling includes the frequency bit map.

In some examples of the method, apparatuses, and non-transitory computer-readable medium described herein, the control signaling may be system information associated with the network entity.

A method for wireless communications by a UE is described. The method may include identifying an energy savings configuration for a discontinuous cycle of a cell associated with a network entity, the energy savings configuration including a DTX activation state of the cell, a DRX activation state of the cell, or both for the discontinuous cycle, receiving, from the network entity, control signaling that indicates the energy savings configuration for the discontinuous cycle for a set of UEs including the UE, and communicating, during the discontinuous cycle, with the network entity in accordance with the energy savings configuration.

A UE for wireless communications is described. The UE may include one or more memories storing processor executable code, and one or more processors coupled with the one or more memories. The one or more processors may individually or collectively be operable to execute the code to cause the UE to identify an energy savings configuration for a discontinuous cycle of a cell associated with a network entity, the energy savings configuration including a DTX activation state of the cell, a DRX activation state of the cell, or both for the discontinuous cycle, receive, from the network entity, control signaling that indicates the energy savings configuration for the discontinuous cycle for a set of UEs including the UE, and communicate, during the discontinuous cycle, with the network entity in accordance with the energy savings configuration.

Another UE for wireless communications is described. The UE may include means for identifying an energy savings configuration for a discontinuous cycle of a cell associated with a network entity, the energy savings configuration including a DTX activation state of the cell, a DRX activation state of the cell, or both for the discontinuous cycle, means for receiving, from the network entity, control signaling that indicates the energy savings configuration for the discontinuous cycle for a set of UEs including the UE, and means for communicating, during the discontinuous cycle, with the network entity in accordance with the energy savings configuration.

A non-transitory computer-readable medium storing code for wireless communications is described. The code may include instructions executable by one or more processors to identify an energy savings configuration for a discontinuous cycle of a cell associated with a network entity, the energy savings configuration including a DTX activation state of the cell, a DRX activation state of the cell, or both for the discontinuous cycle, receive, from the network entity, control signaling that indicates the energy savings configuration for the discontinuous cycle for a set of UEs including the UE, and communicate, during the discontinuous cycle, with the network entity in accordance with the energy savings configuration.

In some examples of the method, UEs, and non-transitory computer-readable medium described herein, receiving the control signaling may include operations, features, means, or instructions for receiving, via a downlink control information of a power saving monitoring procedure, the energy savings configuration for the discontinuous cycle prior to the discontinuous cycle.

In some examples of the method, UEs, and non-transitory computer-readable medium described herein, receiving the control signaling may include operations, features, means, or instructions for receiving, as part of the control signaling, an energy saving radio network temporary identifier that may be associated with the UE of the set of UEs.

In some examples of the method, UEs, and non-transitory computer-readable medium described herein, the set of UEs includes a subset of UEs including the UE and the method, UEs, and non-transitory computer-readable medium may include further operations, features, means, or instructions for receiving, as part of the energy saving radio network temporary identifier, a UE group indicator for the subset of UEs, where the UE group indicator includes at least a timing offset for the subset of UEs, the timing offset indicating a duration of time after a start of the discontinuous cycle for the subset of UEs to wait before communicating with the cell.

In some examples of the method, UEs, and non-transitory computer-readable medium described herein, the UE group indicator further includes an activation status of the subset of UEs, a duration of the activation status, and a periodicity associated with activation of the subset of UEs.

In some examples of the method, UEs, and non-transitory computer-readable medium described herein, the subset of UE and the UE group indicator may be based on the energy savings configuration.

In some examples of the method, UEs, and non-transitory computer-readable medium described herein, receiving the control signaling may include operations, features, means, or instructions for receiving, as part of the control signaling, an indication for the set of UEs to apply a cell DTX cycle or a cell DRX cycle for the discontinuous cycle.

In some examples of the method, UEs, and non-transitory computer-readable medium described herein, transmitting the control signaling may include operations, features, means, or instructions for receiving, as part of the control signaling, an indication for a duration of the discontinuous cycle.

Some examples of the method, UEs, and non-transitory computer-readable medium described herein may further include operations, features, means, or instructions for receiving second control signaling deactivating the energy savings configuration, where the energy savings configuration may be applied for the set of UEs until receiving the second control signaling.

In some examples of the method, UEs, and non-transitory computer-readable medium described herein, receiving the control signaling may include operations, features, means, or instructions for receiving, as part of the control signaling, an indication of whether channel state information reporting at the set of UEs may be activated or deactivated during a quantity of discontinuous cycles that includes the discontinuous cycle.

In some examples of the method, UEs, and non-transitory computer-readable medium described herein, receiving the control signaling may include operations, features, means, or instructions for receiving, as part of the control signaling, an indication of whether reference signal received power reporting at the set of UEs may be activated or deactivated during a quantity of discontinuous cycles that includes the discontinuous cycle.

In some examples of the method, UEs, and non-transitory computer-readable medium described herein, the control signaling may be downlink control information.

A method for wireless communications by a UE is described. The method may include identifying an energy savings configuration for a set of cells associated with a network entity, the energy savings configuration including a respective DTX activation state for one or more cells of the set of cells, a DRX activation state for the one or more cells of the set of cells, or both, receiving, from the network entity, control signaling that indicates an energy savings activation state for the one or more cells of the set of cells based on the energy savings configuration, and communicating, via the set of cells, with the network entity in accordance with the energy savings activation state.

A UE for wireless communications is described. The UE may include one or more memories storing processor executable code, and one or more processors coupled with the one or more memories. The one or more processors may individually or collectively be operable to execute the code to cause the UE to identify an energy savings configuration for a set of cells associated with a network entity, the energy savings configuration including a respective DTX activation state for one or more cells of the set of cells, a DRX activation state for the one or more cells of the set of cells, or both, receive, from the network entity, control signaling that indicates an energy savings activation state for the one or more cells of the set of cells based on the energy savings configuration, and communicate, via the set of cells, with the network entity in accordance with the energy savings activation state.

Another UE for wireless communications is described. The UE may include means for identifying an energy savings configuration for a set of cells associated with a network entity, the energy savings configuration including a respective DTX activation state for one or more cells of the set of cells, a DRX activation state for the one or more cells of the set of cells, or both, means for receiving, from the network entity, control signaling that indicates an energy savings activation state for the one or more cells of the set of cells based on the energy savings configuration, and means for communicating, via the set of cells, with the network entity in accordance with the energy savings activation state.

A non-transitory computer-readable medium storing code for wireless communications is described. The code may include instructions executable by one or more processors to identify an energy savings configuration for a set of cells associated with a network entity, the energy savings configuration including a respective DTX activation state for one or more cells of the set of cells, a DRX activation state for the one or more cells of the set of cells, or both, receive, from the network entity, control signaling that indicates an energy savings activation state for the one or more cells of the set of cells based on the energy savings configuration, and communicate, via the set of cells, with the network entity in accordance with the energy savings activation state.

In some examples of the method, UEs, and non-transitory computer-readable medium described herein, receiving the control signaling may include operations, features, means, or instructions for receiving, as part of the control signaling, a respective cell ID for each cell of the set of cells, where the respective DTX activation state and the respective DRX activation state for a given cell of the set of cells corresponds to the respective cell ID of the given cell.

In some examples of the method, UEs, and non-transitory computer-readable medium described herein, a system information block includes each respective cell ID, each respective DTX activation state, and each respective DRX activation state.

Some examples of the method, UEs, and non-transitory computer-readable medium described herein may further include operations, features, means, or instructions for receiving one or more control messages indicating a cell bit map, where each bit of the cell bit map may be associated with a DTX activation state of a given cell of the one or more cells, a DRX activation state of the given cell, or both, where the control signaling includes the cell bit map.

In some examples of the method, UEs, and non-transitory computer-readable medium described herein, receiving the one or more control messages may include operations, features, means, or instructions for receiving, via broadcast, a radio resource control message indicating the cell bit map.

In some examples of the method, UEs, and non-transitory computer-readable medium described herein, receiving the one or more control messages may include operations, features, means, or instructions for receiving, via unicast, a medium access control-control element message, where the medium access control-control element message includes the cell bit map.

In some examples of the method, UEs, and non-transitory computer-readable medium described herein, receiving the control signaling may include operations, features, means, or instructions for receiving a respective set of bits associated with each respective frequency, where a first bit for a given set of bits indicates a DTX activation state of an associated frequency, and a second bit of the given set of bits indicates a DRX activation state of the associated frequency.

In some examples of the method, UEs, and non-transitory computer-readable medium described herein, each cell of the one or more cells may be associated with a respective frequency and the method, UEs, and non-transitory computer-readable medium may include further operations, features, means, or instructions for receiving a radio resource control message indicating a frequency bit map, where each bit of the frequency bit map may be associated with a DTX activation state of a given cell of the one or more cells, a DRX activation state of the given cell, or both, where the control signaling includes the frequency bit map.

In some examples of the method, UEs, and non-transitory computer-readable medium described herein, the control signaling may be system information associated with the network entity.

DETAILED DESCRIPTION

Figure 1:
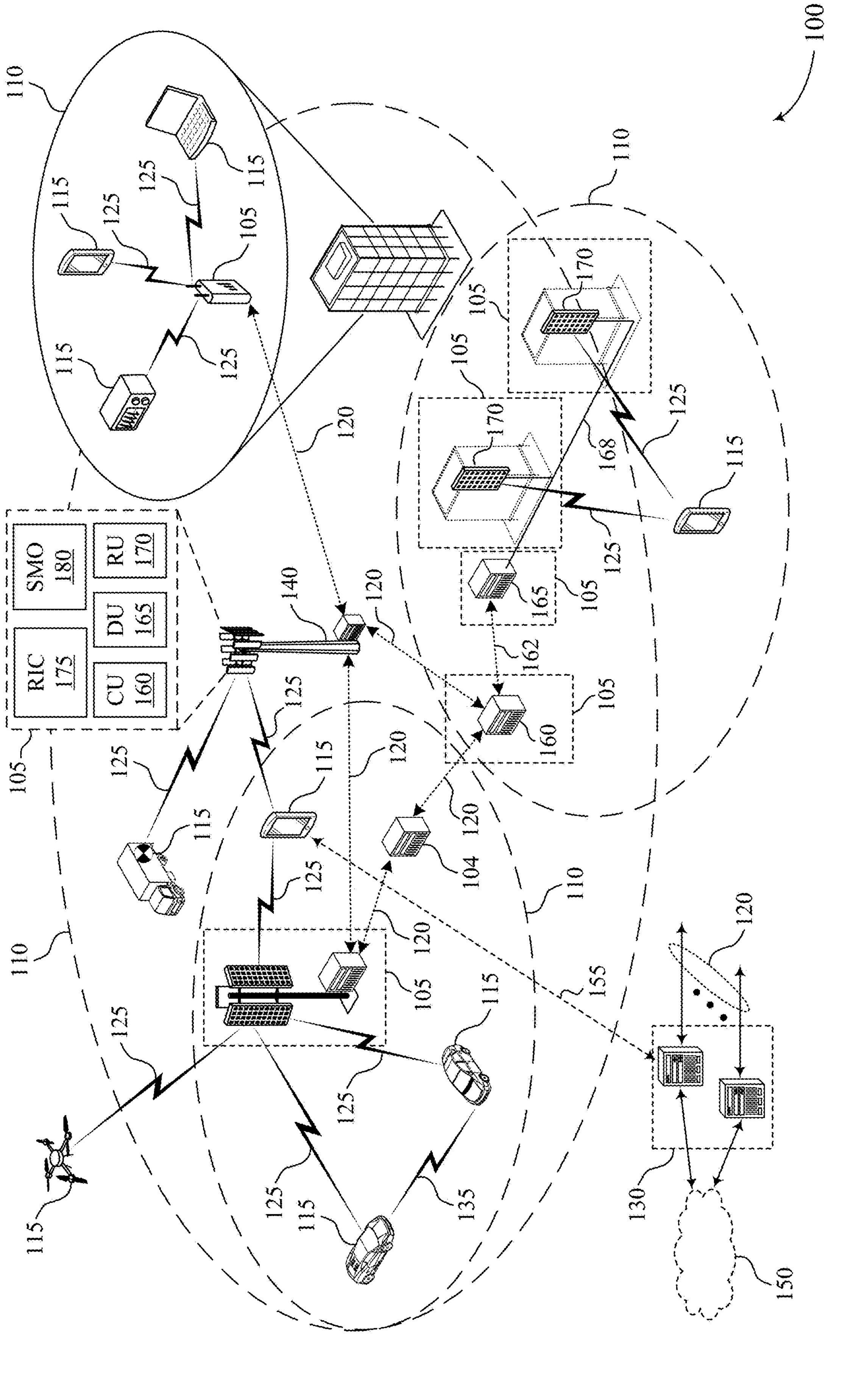
FIG. 1 shows an example of a wireless communications system that supports techniques for cell discontinuous reception (DRX) and discontinuous transmission (DTX) state activation in accordance with one or more aspects of the present disclosure.

In some examples of wireless communications, a network entity may operate in accordance with reduced downlink transmission or uplink reception activity based on UE discontinuous reception (DRX) configurations. For example, during a UE DRX off period, the network entity may refrain from transmitting downlink messages to the UE, which may decrease power consumption at the network entity. As such, the network entity may implicitly reduce downlink transmissions in accordance with UE DRX configurations. However, while in a UE DRX off period, a UE may still initiate uplink transmissions according to the configured resources. As such, the network entity may still receive uplink transmissions from the UE during UE DRX off periods, which may increase power consumption at the network entity. As such, it may be advantageous for the network entity to utilize cell discontinuous transmission (DTX) techniques and cell DRX techniques. In examples where cell DTX is inactive, the corresponding cell of the network entity may refrain from performing downlink transmissions. In examples where cell DRX is inactive, the corresponding cell of the network entity may refrain from receiving uplink transmissions. As such, cell DTX and cell DRX operations may reduce energy expenditure at the network entity.

In some cases, the network entity may indicate a cell DTX activation state and a cell DRX activation state to one or more devices the network entity is communicating with. For example, the network entity may communicate with multiple user equipments (UEs) and indicate cell DTX activation states and a cell DRX activation states to each of the UEs. However, indicating a cell DTX/DRX activation states to each of the UEs via separate signaling may increase signaling overhead for the network. Additionally, a network entity may support multiple cells with respective cell DTX/DRX configurations. As such, indicating a separate DTX/DRX activation states for each cell may increase signaling overhead of the network.

The techniques described herein provide mechanisms for informing a set of UEs whether one or more cells are active or inactive during one or more discontinuous cycles of the network entity. For example, a first cell of the network entity may transmit to a set of UEs control signaling that indicates an energy savings configuration for a one or more discontinuous cycles of the cell. The energy saving configuration may include a DTX activation state of the first cell (e.g., whether DTX is activated or deactivated for a cell), a DRX activation state of the first cell (e.g., whether DRX is activated or deactivated for a cell), or both for one or more discontinuous cycles. Additionally, or alternatively, the first cell may indicate respective DTX and DRX activation states for neighboring cells of the network entity. That is, a single energy savings configuration message may indicate to multiple UEs, a respective DTX/DRX activation states for multiple cells associated with the network entity. In some examples, the network entity may receive acknowledgment messages from each of the UEs indicating that the UEs activated or deactivated communications with one or more of the cells in accordance with the energy savings configuration.

Aspects of the disclosure are initially described in the context of wireless communications systems, discontinuous cycle timelines, multi-cell activation configurations, and process flows. Aspects of the disclosure are further illustrated by and described with reference to apparatus diagrams, system diagrams, and flowcharts that relate to techniques for cell DRX and DTX state activation.

FIG. 1 shows an example of a wireless communications system 100 that supports techniques for cell DRX and DTX state activation in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support techniques for cell DRX and DTX state activation as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a transmitting device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some examples of wireless communications system 100, a network entity 105 may operate in accordance with cell DTX operation and cell DRX operation. In examples where cell DTX is inactive, the corresponding cell of the network entity 105 may refrain from performing downlink transmissions. In examples where cell DRX is inactive, the corresponding cell of the network entity 105 may refrain from receiving uplink transmissions. As such, cell DTX and cell DRX operations may reduce energy expenditure at the network entity 105. In some cases, the network entity 105 may indicate a cell DTX activation state and a cell DRX activation state to one or more devices the network entity 105 is communicating with. For example, the network entity 105 may communicate with multiple UEs 115 and indicate cell DTX activation states and cell DRX activation states to each of the UEs 115. However, indicating a cell DTX/DRX activation states to each of the UEs 115 via separate signaling may increase signaling overhead for the network. Additionally, a network entity 105 may support multiple cells with respective cell DTX/DRX configurations. As such, indicating a separate DTX/DRX activation states for each cell may increase signaling overhead of the network.

The techniques described herein provide mechanisms for informing a set of UEs 115 whether one or more cells are active or inactive during one or more discontinuous cycles of the network entity 105. For example, a first cell of the network entity 105 may transmit to a set of UEs 115 control signaling that indicates an energy savings configuration for a one or more discontinuous cycles of the cell. The energy saving configuration may include a DTX activation state of the first cell (e.g., whether DTX is activated or deactivated for a cell), a DRX activation state of the first cell (e.g., whether DRX is activated or deactivated for a cell), or both for one or more discontinuous cycles. Additionally, or alternatively, the first cell may indicate respective DTX and DRX activation states for neighboring cells of the network entity 105. That is, a single energy savings configuration message may indicate to multiple UEs 115, a respective DTX/DRX activation states for multiple cells associated with the network entity 105. In some examples, the network entity 105 may receive acknowledgment messages from each of the UEs 115 indicating that the UEs 115 activated or deactivated communications with one or more of the cells in accordance with the energy savings configuration.

Figure 2:
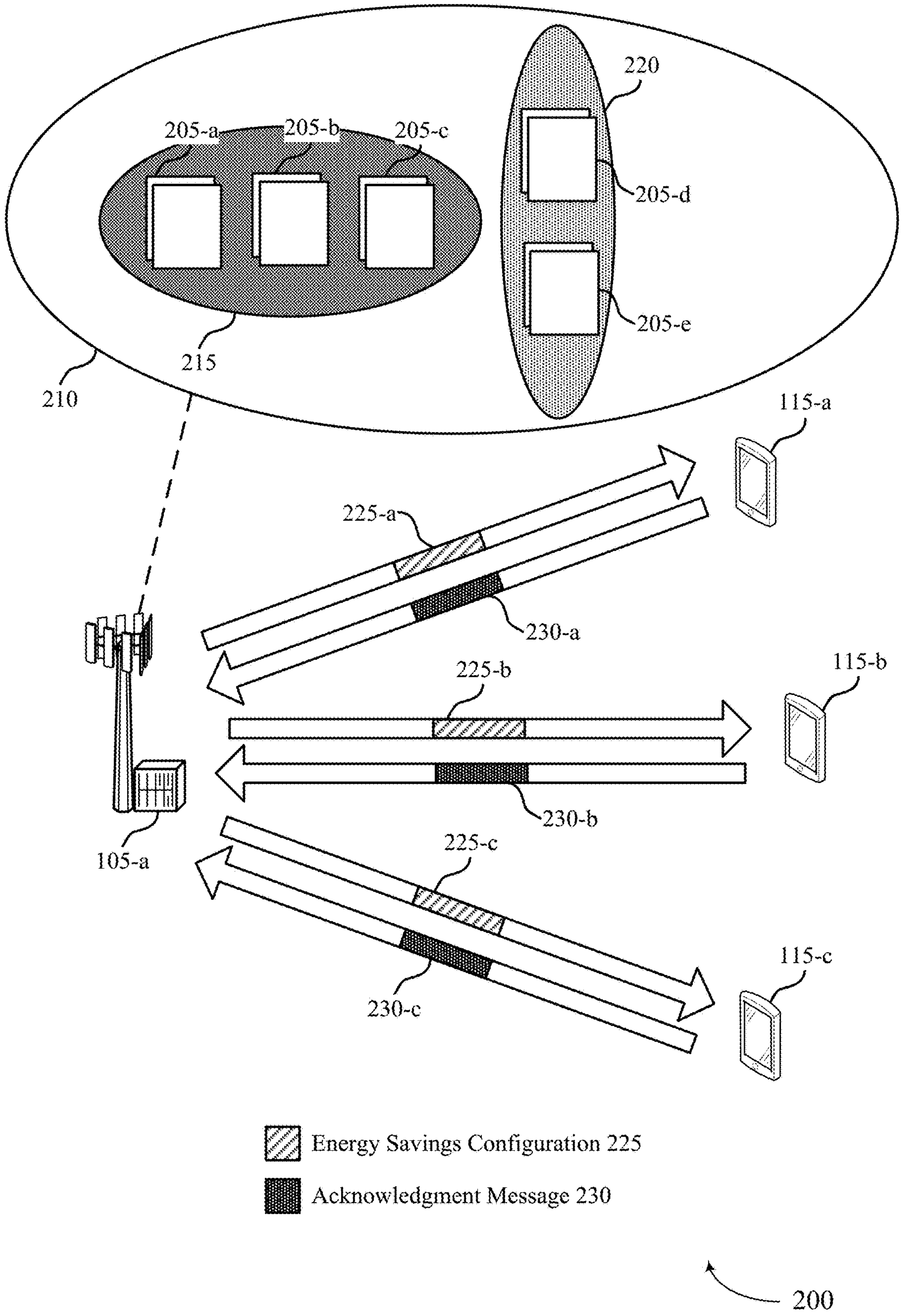
FIG. 2 shows an example of a wireless communications system that supports techniques for cell DRX and DTX state activation in accordance with one or more aspects of the present disclosure.

FIG. 2 shows an example of a wireless communications system 200 that supports techniques for cell DRX and DTX state activation in accordance with one or more aspects of the present disclosure. In some examples, wireless communications system 200 may implement or be implemented by one or more aspects of wireless communications system 100. For example, wireless communications system 200 may include a network entity 105-*a*, a UE 115-*a*, 115-*b*, and 115-*c*, which may be examples of a network entity 105 and UEs 115 as described with reference to FIG. 1. Network entity 105-*a* may include a cell set 210, where each cell 205 of the cell set 210 may represent any one or more of the examples of a cell described with reference to FIG. 1. In some examples, the network entity 105-*a* may include each of the cells 205 illustrated by FIG. 1, while in some other examples, the network entity 105-*a* may include at least a subset or a portion of the cells 205, and one or more second network entities 105 may include a remaining portion of the cells 205.

One or more of the cells 205 may communicate with UEs 115, for example, to support uplink and/or downlink communications with network entity 105-*a*, or with another network entity 105. For example, UEs 115 may communicate with an activated subset 215 of cells 205, which may include cells 205-*a*, 205-*b*, and 205-*c* (e.g., among other cells 205). At least one of the cells 205 in the activated subset 215 may be configured as a PCell (e.g., cell 205-*a* may be a PCell for UE 115-*a*). In some examples, the PCell may refer to a source cell 205 over which a UE 115 performs an initial connection with the network entity 105-*a*, or a connection re-establishment with the network entity 105-*a*, and is the cell 205 with which the UEs 115 performs a majority of communications with the network entity 105-*a*. Additionally, a non-activated subset 220 of cells 205 may include cells 205-*d* and 205-*e* (e.g., among other cells 205).

In some examples, the network entity 105-*a* may use reduced downlink transmission and uplink reception activity without an explicit cell DTX/DRX due to UE DRX configurations and configured transmission and reception (e.g., common channels and signals). For example, connected DRX (CDRX) may be configured per UE 115, and the network entity 105-*a* may align of the UE DRX cycles or offsets for different UEs 115 via RRC signaling. During UE DRX off period, UE 115 may refrain from monitoring for downlink transmissions from the network entity 105-*a* (e.g., via a physical downlink control channel (PDCCH)). As such, by aligning the DRX cycles across multiple UEs 115, the network entity 105-*a* may align downlink transmissions for the UEs 115, which may reduce a duration the network entity 105-*a* is actively transmitting, resulting in power savings for the network. During UE DRX off period, however, a UE 115 may initiate uplink transmissions according to the configured resources (e.g., using a physical uplink control channel (PUCCH), a random access channel (RACH), a scheduling request (SR), or a configured grant physical uplink shared channel (CG-PUSCH)). As such, it may be advantageous for the network entity 105-*a* to operate in accordance with cell DRX and cell DTX modes to align or omit DRX patterns across the multiple UEs 115.

As such, wireless communications system 200 may include mechanisms for informing UEs 115 energy savings information associated with one or more cells 205 of the network entity 105-*a*. Such energy savings information may include enhancements to UE DRX configuration (e.g., to align or omit DRX cycles or start offsets of DRX for UEs 115 in connected mode, idle mode, or inactive mode). As such, the energy savings information may allow for longer durations of cell inactivity. In some examples, during a cell DTX inactive state, a corresponding cell 205 may operate in accordance with limited or no downlink transmissions. In some examples, during a cell DRX inactive state, a corresponding cell 205 may operate in accordance with limited or no uplink reception from the UEs 115.

In some examples, one or more of the UEs 115 may not support cell DTX and cell DRX operations. As such, the network entity 105-*a* may refrain from applying cell DTX and cell DRX operations to signals or channels common across multiple UEs 115 used for idle modes, inactive modes, or connected modes. Additionally, or alternatively, the network entity 105-*a* may apply cell DTX and cell DRX operations in a UE 115 specific manner (e.g., to one or more UEs 115 that support cell DTX and cell DRX operations).

To support cell DTX and cell DRX operations, the network entity 105-*a* may transmit an energy savings configuration 225, to each of the UEs 115 (e.g., energy savings configuration 225-*a*, 225-*b*, and 225-*c* to UE 115-*a*, 115-*b*, and 115-*c* respectively). As described herein, the energy savings configuration 225 may include information associated with cell DTX/DRX pattern, timers, parameters, procedure, or a combination thereof. Additionally, or alternatively, the energy savings configuration 225 may include configuration and indication of cell DTX/DRX information to the UEs 115. Additionally, or alternatively, the energy savings configuration 225 may include information associated with respective UE 115 behavior and procedures when cell DTX/DRX is in operation, an indication of when a receptive UE DRX operation is configured, or both. Additionally, or alternatively, the energy savings configuration 225 may include indication of an uplink procedure related to cell DTX/DRX (e.g., UE 115 request or assistance feedback). Additionally, or alternatively, the energy savings configuration 225 may include information to UE DRX configuration, UE DRX parameter adaptation, or both.

In some examples, the network entity 105-*a* may apply cell DTX/DRX to UEs 115 in a connected state (e.g., RRC_CONNECTED state). In some examples, the network entity 105-*a* may configure a periodic cell DTX/DRX (e.g., active, and non-active periods) via UE-specific RRC signaling per serving cell 205. In some cases, cell DTX/DRX behavior during non-active periods may correspond to one or more options. In some examples, the network entity 105-*a* may turn off all transmission and reception for data traffic and reference signal during cell DTX/DRX non-active periods. In some examples, the network entity 105-*a* may turn off transmission and reception for data traffic, but still transmit and receive reference signals during cell DTX/DRX non-active periods. In some examples, the network entity 105-*a* may turn off dynamic data transmission and reception during cell DTX/DRX non-active periods (e.g., may still perform transmission and reception in periodic resources such as a semi-persistent scheduling (SPS), a CG-PUSCH, a SR, a RACH, and a sounding reference signal (SRS)).

In some cases, the cell DTX/DRX mode may be activated or de-activated via dynamic L1/L2 signaling and UE 115 specific RRC signaling. The network entity 105-*a* may use UE 115 specific or common L1/L2 signaling for activating or deactivating the cell DTX/DRX mode.

In some cases, cell DTX and cell DRX modes can be configured and operated separately (e.g., one RRC configuration set for downlink and one RRC configuration set for uplink). Additionally, or alternatively, the network entity 105-*a* may configure and operate cell DTX and cell DRX modes together. The network entity 105-*a* may configure one or more parameters per cell DTX/DRX configuration, such as periodicity, start slot, offset from start slot, and on duration.

In some cases, the network entity 105-*a* may exchange or coordinate cell DTX/DRX information with neighboring network entities 105. In some examples, the network entity 105-*a* may receive and use respective cell DTX/DRX information from neighboring network entities 105 to determine the network entity 105-*a* cell DTX/DRX configuration for network energy saving purposes. In some cases, UEs 115 in a connected mode may perform RACH and receive system information blocks (SIBs) during a non-active duration of cell DTX, cell DRX, or both (e.g., same behavior for cell DTX and cell DRX).

According to the techniques described herein, the UEs 115 operating in a connected mode may refrain from transmitting or receiving communications from a cell 205 of the network entity 105-*a* during non-active periods of cell DTX/DRX of the cell 205. For example, the UEs 115 may refrain from receiving downlink signals such as periodic or semi-persistent CSI-RS (e.g., including tracking reference signals (TRSs)), positioning reference signals (PRSs), PDCCHs scrambled with a UE specific radio network temporary identifier (RNTI), PDCCHs in Type-3 common search space (CSS), and SPS physical downlink shared channels (SPS-PDSCHs). Additionally, the UEs 115 may refrain from receiving uplink signals such as SRs, periodic or semi-persistent CSI reporting, periodic or semi-persistent SRSs, and CG-PUSCHs.

In some examples, the network entity 105-*a* may perform cell DTX/DRX activation and deactivation via RRC signaling (e.g., activate once configured by RRC and deactivated once RC configuration is released. However, it may be advantageous to transmit cell DTX/DRX activation and deactivation via L1/L2 signaling. Additionally, the network entity 105-*a* may maintain cell DTX/DRX on a per-serving cell 205 basis. As such, configuring a respective L1 group signaling occasion per serving cell 205 may increase power consumption at the network entity 105-*a*. Additionally, transmitting unicast RRC, or L1/L2 activation for each UE may increase signaling overhead of the wireless communications system 200.

As such, the network entity 105-*a* may reduce signaling overhead associated with cell DTX/DRX configuration and activation or deactivation by operating in accordance with the techniques described herein. For example, the network entity 105-*a* may transmit the energy savings configuration 225 to each of the UEs 115, which may include an indication of DTX activation state of a cell 205 (e.g., whether DTX is activated or deactivated for a cell 205), a DRX activation state for a cell 205 (e.g., whether DRX is activated or deactivated for the cell 205), or both for one or more cells 205 associated with the network entity 105-*a*. As such, the UEs 115 may apply the DTX and DRX activation states included in the energy savings configuration 225 for the one or more cells 205 indicated. In some examples, the energy savings configuration 225 may indicate for the UEs 115 to apply the indicated DTX and DRX activation states for a next discontinuous cycle of the network entity 105-*a* (e.g., a DTX cycle, a DRX cycle, or a DX/DRX cycle). In some examples, the energy savings configuration 225 may indicate for the UEs 115 to apply the indicated DTX and DRX activation states for a quantity of discontinuous cycles of the network entity 105-*a* (e.g., indicates a value of N associated with N cycles for the UEs 115 to apply the DTX/DRX activation states). In some examples, the energy savings configuration 225 may indicate for the UEs 115 to apply the indicated DTX and DRX activation states until explicit indication otherwise (e.g., control signaling that indicates a change to one or more DTX and DRX activation states).

In some cases, the energy savings configuration 225 may be apply techniques of wake up signaling (WUS) used to configure UE DRX operation modes at the UEs 115. For example, the energy savings configuration 225 may be included in downlink control information (DCI). For example, the DCI may be of DCI format 2_6 and include an energy savings RNTI (ES-RNTI) for scrambling a CRC of DCI format 2_6. In some examples, the ES-RNTI may be associated with one or more UEs 115. For example, the network entity 105-*a* transmit via control signaling (e.g., RRC signaling, medium access control (MAC) signaling, or DCI) an indication to UE 115-*a*, 115-*b*, and 115-*c* that associates each of UE 115-*a*, 115-*b*, and 115-*c* with the ES-RNTI. As such, the ES-RNTI may serve as a group identifier for multiple UEs 115. Additionally, or alternatively, the network entity 105-*a* may configure the UEs 115 via control signaling (e.g., RRC, MAC, or DCI) with one or more Type3-PDCCH CSS sets for monitoring the DCI format 2_6 with ES-RNTI. In some examples, the network entity 105-*a* may configure more than one search space set for the DCI format 2_6. In some examples, CORESETs associated with the search space sets of DCI format 2_6 may have different transmission configuration indication (TCI) states (e.g., WUS beam sweeping in FR2). In some examples, DCI format 2_6 may inform each of the UEs 115 configured with the ES-RNTI of whether to start a cell DTX cycle, a cell DRX cycle, or both for a next CDRX cycle. That is the energy savings configuration 225 (e.g., serving as a WUS) may include information about CDRX for each of the UEs 115, information about cell DTX/DRX, or both. Additionally, or alternatively, the energy savings configuration 225 may indicate cell DTX/DRX activation until explicit transmission of cell DTX/DRX deactivation or deconfiguration from the network entity 105-*a*. Additionally, or alternatively, the energy savings configuration 225 may indicate cell DTX/DRX deactivation until explicit transmission of cell DTX/DRX activation or reconfiguration from the network entity 105-*a*.

In some examples, the UEs 115 associated with the ES-RNTI may be divided into separate subsets of UEs 115 within the ES-RNTI (e.g., UE 115-*a* associated with a first UE subset, UE 115-*b* associated with a second UE subset, and UE 115-*c* associated with a third UE subset). In some examples, the network entity 105-*a* may configure each of the UE subsets with respective information associated with the DTX/DRX activation states of one or more cells 205. Further discussion of ES-RNTI including multiple separate UE subsets is described herein, including with reference to FIG. 4.

In some examples, the energy savings configuration 225 may include cell DTX/DRX activation states for multiple cells 205. That is, a first cell 205 of the network entity 105-*a* (e.g., cell 205-*a*) may transmit information pertaining to cell DTX/DRX activation states for neighboring cells 205 (e.g., cell 205-*b* and 205-*c*). In some cases, the energy savings configuration 225 may include a respective cell ID for each cell 205 indicated. Further discussion of DTX/DRX activation state indication via cell IDs is described herein, including with reference to FIG. 5A. In some cases, the energy savings configuration 225 may include a respective frequency for each cell 205 indicated. Further discussion of DTX/DRX activation state indication via frequency is described herein, including with reference to FIG. 5B.

In some cases, the energy savings configuration 225 may include indication to whether the UEs 115 may perform periodic CSI-RS reporting during cell DRX (e.g., cell DRX inactivity, in which the cell refrains from receiving messages). That is, the energy savings configuration 225 may include a separate activation indication for CSI reporting in the DCI carrying the energy savings configuration 225.

Additionally, or alternatively, the energy savings configuration 225 may include indication to whether the UEs 115 may perform reference signal received power (RSRP) reporting on PUCCH for cell DRX (e.g., cell DRX inactivity, in which the cell refrains from receiving messages). That is, the energy savings configuration 225 may include a separate activation indication for L1-RSRP reporting in the DCI carrying the energy savings configuration 225. While the techniques of wireless communications system 200 describe a DCI of format 26 carrying the energy savings configuration 225, it is understood that other DCI formats and DCI types may carry the energy savings configuration 225. For example, energy savings configuration 225 may be indicated in scheduling DCIs (e.g., DCI format 0, DCI format 0_1, DCI format 1_0) or a paging DCI (e.g., scrambled with paging RNTI (P-RNTI)).

In some cases, a MAC control element (MAC-CE) command may include a bit map, where each bit of the bit map corresponds to whether a cell DTX/DRX is activated in a serving cell 205 (e.g., inter-band or intra-band). In such cases, the serving cell 205 information may be local to each UE. That is the network entity 105-*a* may transmit, via unicast, respective MAC-CE commands including the bit map to each of the UEs 115. In some cases, MAC-CE may be used in addition to the ES-RNTI to provide cell DTX/DRX activation state information associated with neighboring cells 205 (e.g., along with the serving cells 205) to connected UEs 115 (e.g., UEs 115 configured via RRC signaling).

In some cases, the network entity 105-*a* may transmit a configuration, an activation, or a deactivation of cell DTX/DRX to the UEs 115 via a system information (SI) update. In such cases, SIB1 may carry reconfiguration, activation, or deactivation of cell DTX/DRX for the current serving cells 205. Additionally, or alternatively, SIB2 though SIB4 may carry activation or deactivation of cell DTX/DRX for neighboring cells 205.

As such, the UEs 115 may receive the energy savings configuration 225 and apply the one or more cell DTX/DRX activation states associated with one or more cells 205 indicated. In some cases, each UE 115 may transmit an acknowledgment message 230 corresponding to the energy savings configuration 225. For example, for activation and deactivation of multiple cells 205, each UE may transmit a HARQ acknowledgment (ACK) or negative-ACK (NACK) that includes a hybrid process number (HPN). In some examples, the HPN may indicate which cells 205 have been activate or deactivated in accordance with the energy savings configuration 225.

Additionally, or alternatively, each UE may include in the acknowledgment message 230, a MAC-CE confirmation on which cells 205 have been activate or deactivated. For instance, the MAC-CE confirmation may correspond to the format of Table 1:

TABLE 1

| Cell | DTX State | DRX State |
|---|---|---|
| Cell 205-a | Activated | Activated |
| Cell 205-b | Activated | Deactivated |

While Table 1 is an example of a MAC-CE confirmation for the DTX/DRX activation states of two cells 205, it is understood that the MAC-CE confirmation may include DTX/DRX activation states for any quantity of cells 205. For instance, the MAC-CE confirmation may include DTX/DRX activation states for each cell 205 indicated in the energy savings configuration 225. In some cases, the network entity 105-*a* may transmit a respective request message to each UE 115 indicating for the respective UE to send the MAC-CE confirmation that includes cell DRX/DRX states for each cell 205 currently serving the respective UE. In one example, cell 205-*a* and 205-*b* may currently serve UE 115-*a*. As such, Table 1 may correspond to the MAC-CE confirmation the UE 115-*a* may transmit to the network entity 105-*a* based on receiving the request message.

As such, each UE 115 may transmit a respective acknowledgment message 230 (e.g., UE 115-*a* transmits acknowledgment message 230-*a*, UE 115-*b* transmits acknowledgment message 230-*b*, and UE 115-*c* transmits acknowledgment message 230-*c*).

Figure 3:
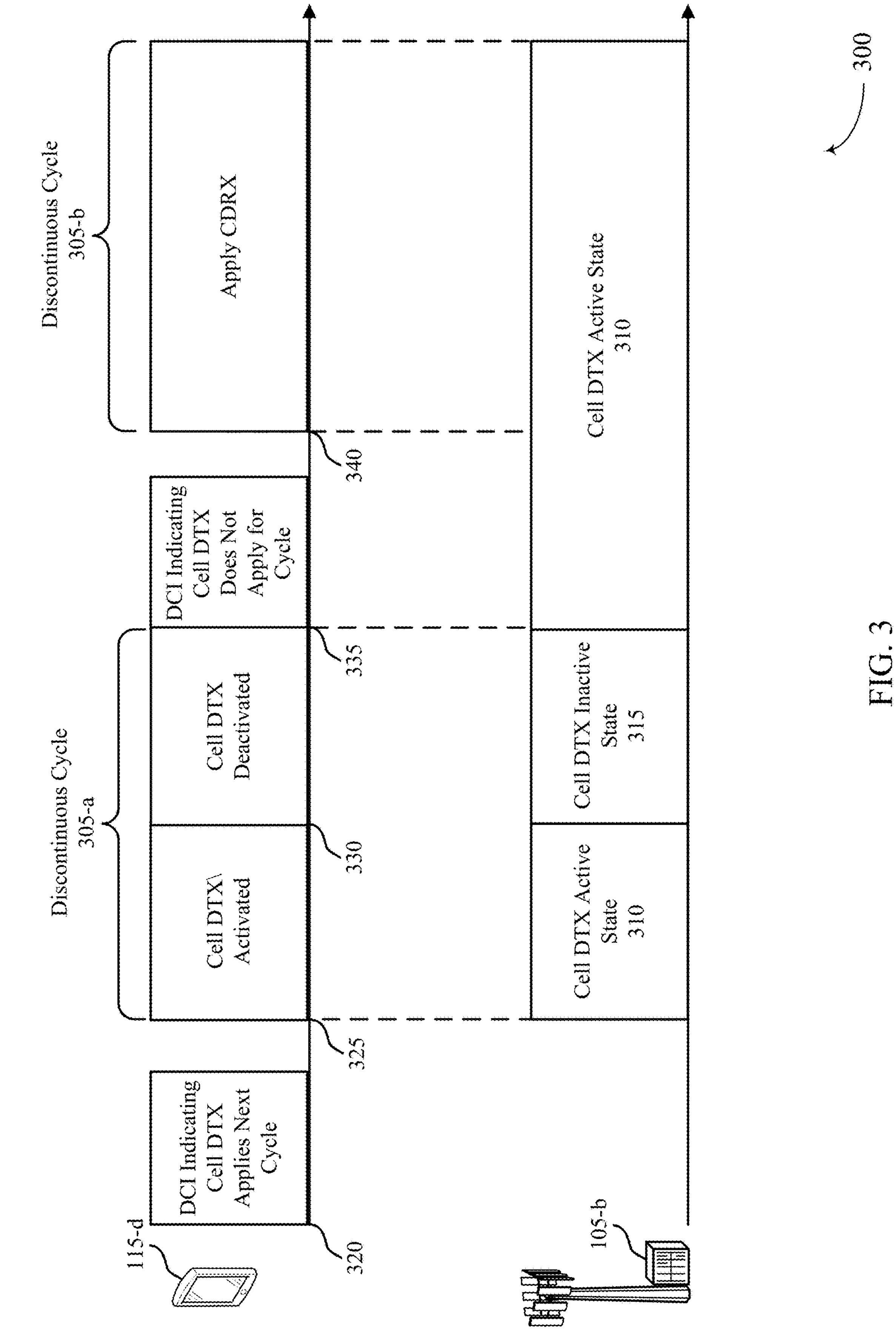
FIG. 3 shows an example of a discontinuous cycle timeline that supports techniques for cell DRX and DTX state activation in accordance with one or more aspects of the present disclosure.

FIG. 3 shows an example of a discontinuous cycle timeline 300 that supports techniques for cell DRX and DTX state activation in accordance with one or more aspects of the present disclosure. In some examples, discontinuous cycle timeline 300 may implement or be implemented by one or more aspects of wireless communications systems 100 and 200. For example, discontinuous cycle timeline 300 may include a network entity 105-*b* and a UE 115-*d*, which may be examples of a network entity 105 and a UE 115 as described with reference to FIGS. 1 and 2. Additionally, discontinuous cycle timeline 300 may include an example of the UE 115-*d* applying cell DTX and cell DRX activation states indicated in the energy savings configuration 225, as described with reference to FIG. 2. While FIG. 3 provides an example of a single UE 115-*d* applying cell DTX/DRX information for a single cell of the network entity 105-*b*, it is understood that any quantity of UEs 115 may apply cell DTX/DRX information for any quantity of cells in accordance with the information provided in the energy savings configuration 225. Additionally, discontinuous cycle timeline 300 provides an example of the UE 115-*d* operating in accordance with cell DTX behavior of the network entity 105-*b*. However, it is understood that discontinuous cycle timeline 300 may further cover techniques for the UE 115-*d* operating in accordance with any combination of cell DTX and cell DRX behavior, as provided by the network entity 105-*b*.

As illustrated in FIG. 3, the network entity 105-*b* may operate in accordance with one or more discontinuous cycles 305 (e.g., discontinuous cycle 305-*a* and 305-*b*). In some cases, a discontinuous cycle of the network entity 105-*b* may correspond to a configured duration of time in which one or more cells of the network entity 105-*b* operate in accordance with cell DTX behavior, cell DRX behavior, or both. For instance, during a first portion of discontinuous cycle 305-*a*, the network entity 105-*b* may operate in accordance with a cell DTX active state 310, in which the corresponding cell of the network entity 105-*b* may transmit one or more messages to the UE 115-*d*. During a second portion of the discontinuous cycle 305-*a*, the cell of the network entity 105-*b* may operate in accordance with a cell DTX inactive state 315, in which the cell may refrain from transmitting one or more messages to the UE 115-*d*. As such, the network entity 105-*b* may transmit to the UE 115-*d* an indication of the cell DTX behavior corresponding to discontinuous cycle 305-*a*. Such an indication may be an example of the energy savings configuration 225 included in a DCI of format 2_6, and may include an ES-RNTI associated with the UE 115-*d*.

As such, at 320, the UE 115-*d* may receive the DCI indicating that cell DTX applies to the next discontinuous cycle 305-*a*, and the behavior associated with the DTX cycle.

At 325, the UE 115-*d* may operate in accordance with the cell DTX active state 310 during the first portion of the discontinuous cycle 305-*a*. As such, the UE 115-*d* may monitor for downlink transmissions (e.g., via a PDCCH or PDSCH) from the cell of the network entity 105-*b*.

At 330, the UE 115-*d* may operate in accordance with the cell DTX inactive state 315 during the second portion of the discontinuous cycle 305-*a*. As such, the UE 115-*d* may refrain from monitoring for downlink transmissions from the cell of the network entity 105-*b*.

After the discontinuous cycle 305-*a*, the cell of the network entity 105-*b* may determine to transition back to the cell DTX active state 310 for a duration of time. In some examples, the cell of the network entity 105-*b* may operate in the cell DTX active state 310 for the duration of discontinuous cycle 305-*b*. As such, the cell may determine that cell DTX behavior does not apply to the discontinuous cycle 305-*b* based on being in the cell DTX active state 310 for the full duration of discontinuous cycle 305-*b*.

As such, at 335, the UE 115-*d* may receive a DCI indicating that cell DTX does not apply to the next discontinuous cycle 305-*b*. Based on cell DTX behavior not applying, the UE 115-*d* may operate in accordance with a configured CDRX behavior. In some examples, the network entity 105-*b* may configure the UE 115-*d* with the CDRX behavior via RRC signaling.

At 340, the UE 115-*d* may operate in accordance with the CDRX behavior for the duration of the discontinuous cycle 305-*b* based on the DCI, at 335 indicating not to apply cell DTX for the discontinuous cycle 305-*b*.

Figure 4:
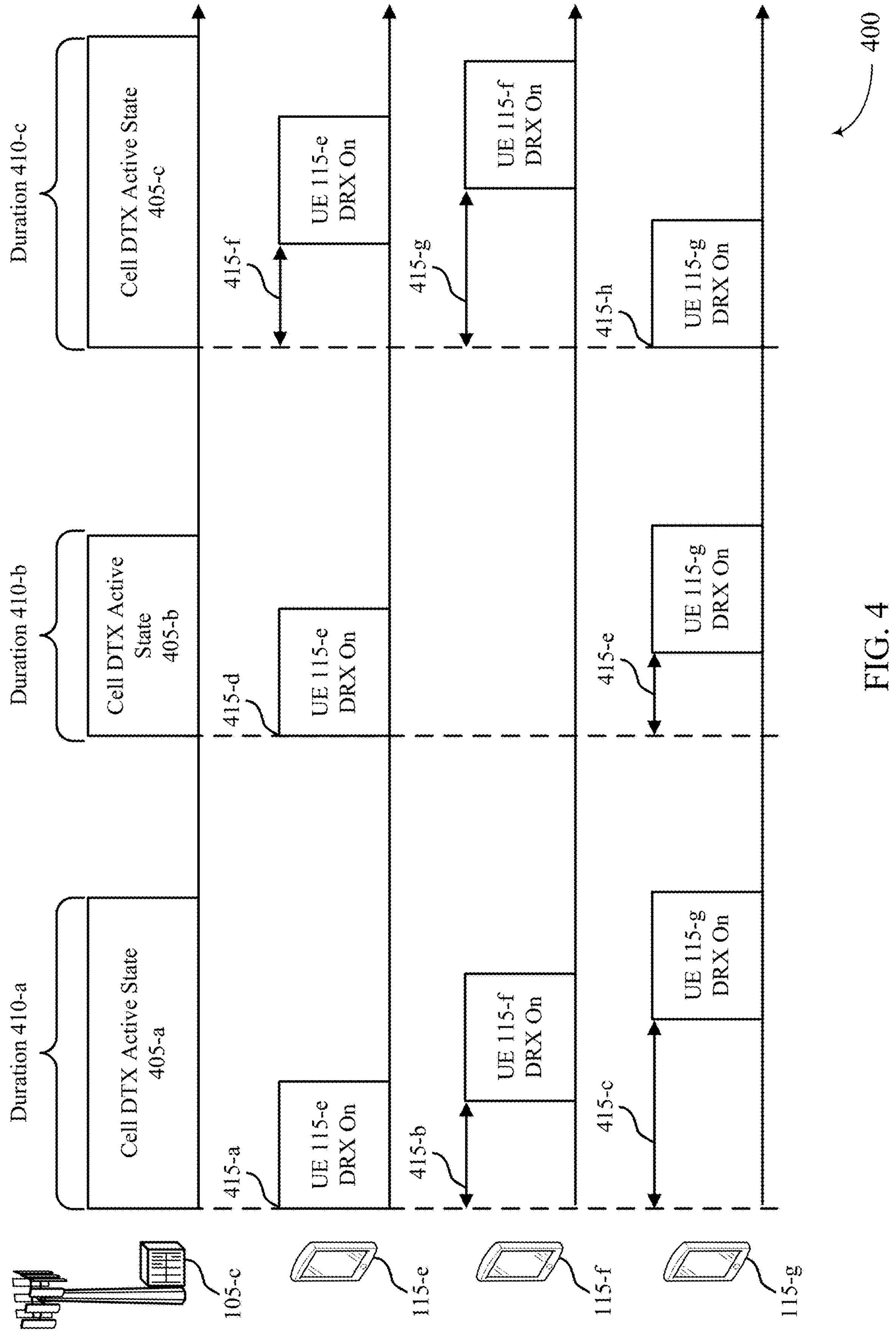
FIG. 4 shows an example of a discontinuous cycle timeline that supports techniques for cell DRX and DTX state activation in accordance with one or more aspects of the present disclosure.

FIG. 4 shows an example of a discontinuous cycle timeline 400 that supports techniques for cell DRX and DTX state activation in accordance with one or more aspects of the present disclosure. In some examples, discontinuous cycle timeline 400 may implement or be implemented by one or more aspects of wireless communications systems 100 and 200. For example, discontinuous cycle timeline 400 may include a network entity 105-*c* and a UE 115-*e*, 115-*f*, and 115-*g*, which may be examples of a network entity 105 and UEs 115 as described with reference to FIGS. 1 and 2. Additionally, discontinuous cycle timeline 400 may include an example of the UEs 115 applying cell DTX and cell DRX activation states indicated in the energy savings configuration 225, as described with reference to FIG. 2. While FIG. 4 provides an example of a three UEs 115 applying cell DTX/DRX information for a single cell of the network entity 105-*c*, it is understood that any quantity of UEs 115 may apply cell DTX/DRX information for any quantity of cells in accordance with the information provided in the energy savings configuration 225. Additionally, discontinuous cycle timeline 400 provides an example of the UEs 115 operating in accordance with cell DTX behavior of the network entity 105-*c*. However, it is understood that discontinuous cycle timeline 400 may further cover techniques for the UEs 115 operating in accordance with any combination of cell DTX and cell DRX behavior, as provided by the network entity 105-*c*.

As illustrated if FIG. 4, a cell of the network entity 105-*c* may operate in accordance with multiple discontinuous cycles, each associated with a respective cell DTX active state 405. For instance, the cell may operate in accordance with cell DTX active state 405-*a* for duration 410-*a*, cell DTX active state 405-*b* for duration 410-*b*, and cell DTX active state 405-*c* for duration 410-*c*. As such, the cell may transmit a respective DCI for each respective cell DTX active state 405 during the corresponding discontinuous cycle. For instance, each DCI may be of format 2_6 and include a ES-RNTI associated with UE 115-*e*, 115-*f*, and 115-*g*.

In some cases, the UEs 115 may be divided into different UE cell DTX/Cell DRX groups. In such cases, the multiple UE groups may correspond to the same ES-RNTI but with a different location in the DCI of format 2_6. For example, a first UE group may correspond to UE 115-*e*, a second UE group may correspond to UE 115-*f*, and a third UE group may correspond to UE 115-*g*. In some examples, each UE group may be associated with a time offset 415 relative to the start of the associated cell DTX active state 405. As such, each UE group may wait the respective time offset 415 before operating in accordance with the corresponding cell DTX active state 405. For example, the DCI associated with cell DTX active state 405-*a* may indicate a time offset 415-*a* for the first UE group, a time offset 415-*b* for the second UE group, and a time offset 415-*c* for the third UE group. Using respective time offsets 415 for each UE group may dynamically stagger the start of each UE DRX on period. As such, staggering the UE DRX periods on a per UE group basis may distribute PDCCH occasions and align the multiple UE DRX periods within the corresponding cell DTX active state 405.

Additionally, or alternatively, the UE group indication may also indicate activation status, duration for the UEs to operate in the DRX on mode, and periodicity specific to the UE group. For instance, the DCI corresponding to cell DTX active state 405-*b* may indicate that the second UE group (e.g., UE 115-*f*) is not active for duration 410-*b* of cell DTX active state 405-*b*.

Additionally, or alternatively, the information corresponding to each UE group (e.g., activation status, duration for the UEs to operate in the DRX on mode, and periodicity) may be configured separately for each cell DTX active state 405. For instance, the first UE group may have a time offset 415-*a* for cell DTX active state 405-*a*, have a time offset 415-*d* for cell DTX active state 405-*b*, and a time offset 415-*f* for cell DTX active state 405-*c*. Additionally, the second UE group may have a time offset 415-*b* for cell DTX active state 405-*a*, may not be active for cell DTX active state 405-*b*, and a time offset 415-*g* for cell DTX active state 405-*c*. Additionally, the third UE group may have a time offset 415-*c* for cell DTX active state 405-*a*, have a time offset 415-*e* for cell DTX active state 405-*b*, and a time offset 415-*h* for cell DTX active state 405-*c*.

Additionally, or alternatively, the UE group indication may also switch between different cell DTX/DRX configurations.

Figure 5A:
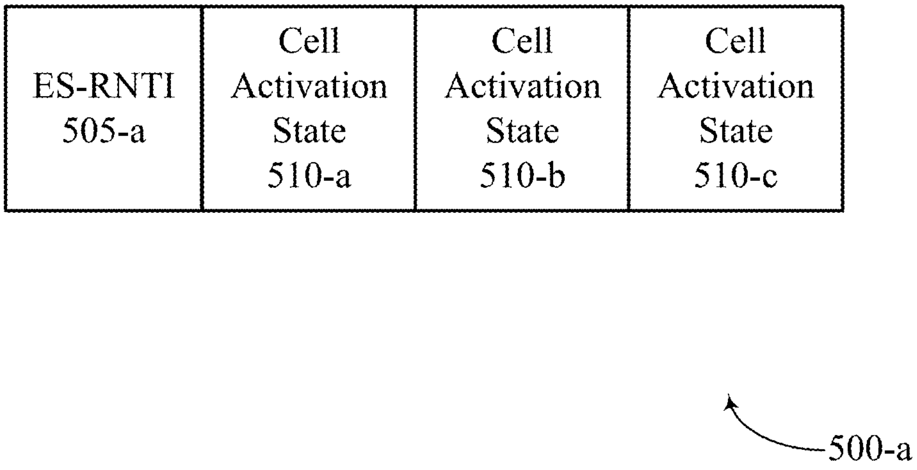
FIGS. 5A and 5B each show a respective example of a multi-cell activation configuration that supports techniques for cell DRX and DTX state activation in accordance with one or more aspects of the present disclosure.
Figure 5B:
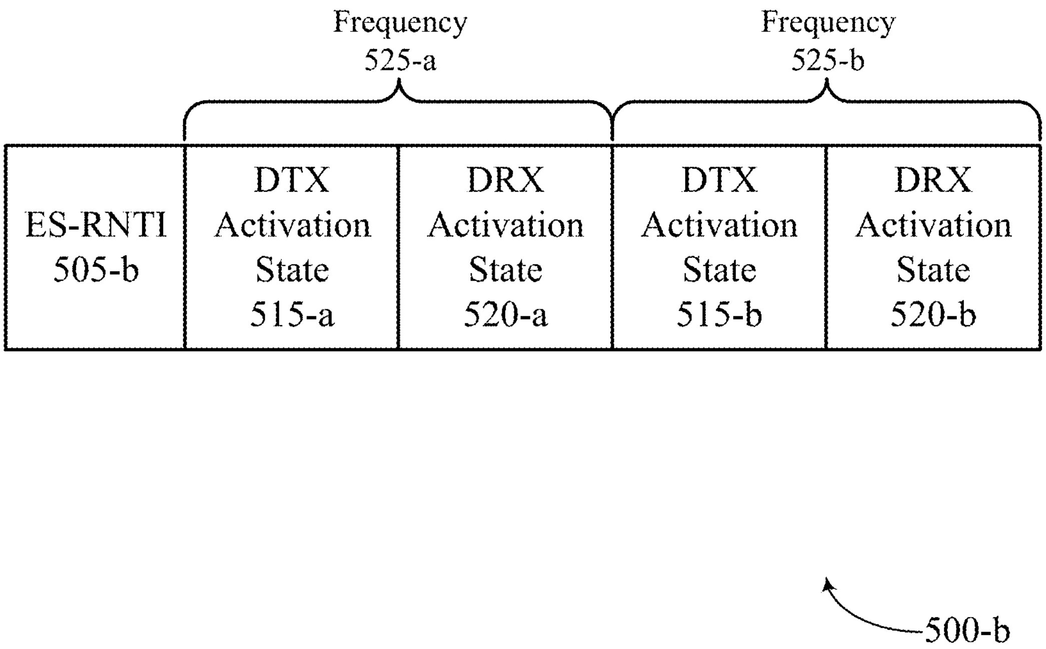

FIGS. 5A and 5B each show respective examples of a multi-cell activation configuration 500-*a* and 500-*b* that supports techniques for cell DRX and DTX state activation in accordance with one or more aspects of the present disclosure. In some examples, multi-cell activation configuration 500-*a* and 500-*b* may implement or be implemented by one or more aspects of wireless communications systems 100 and 200. For example, multi-cell activation configuration 500-*a* and 500-*b* may be respective examples of the energy savings configuration 225, as described with reference to FIG. 2. As such, a cell of a network entity may transmit the multi-cell activation configuration 500-*a* and 500-*b* to one or more UEs 115.

As illustrated in FIG. 5A, the multi-cell activation configuration 500-*a* may include a ES-RNTI 505-*a*. As described with reference to FIG. 3, the ES-RNTI 505-*a* may be an identifier corresponding to one or more UEs 115 associated with the network entity 105. As such, the ES-RNTI 505-*a* may indicate which UEs 115 may apply the cell DTX/DRX information included in the multi-cell activation configuration 500-*a*. Additionally, the multi-cell activation configuration 500-*a* may include multiple cell activation states 510 corresponding to respective cells. For example, the cell activation state 510-*a* may include information pertaining to cell DTX/DRX for a first cell, the cell activation state 510-*b* may include information pertaining to cell DTX/DRX for a second cell, and the cell activation state 510-*c* may include information pertaining to cell DTX/DRX for a third cell.

The information included in the multiple cell activation states 510 may be encoded via one or more options. In a first option, each cell activation state 510 may include a corresponding cell ID for the associated cell, a corresponding cell DTX activation state for the associated cell, and a corresponding cell DRX activation state for the associated cell. With reference to FIG. 5A, the information encoded may include the following: {ES-RNTI 505-*a*, first cell ID, first cell DTX activation state, first cell DRX activation state, second cell ID, second cell DTX activation state, second cell DRX activation state, third cell ID, third cell DTX activation state, third cell DRX activation state}. In some cases, the corresponding cell ID for a given cell may be the cell-ID field included in SIB1 of the SI for the given cell (e.g., a unique 32-bit identifier for the cell). In some cases, the cell DTX activation state and the cell DRX activation state for each cell may be a single bit value, where a first bit value indicates that the DTX or DRX state is active, and a second bit value indicates that the DTX or DRX state is inactive.

In a second option, the network entity may configure a cell DTX/DRX bit map. For example, the network entity may transmit RRC signaling configuring the cell bit map where one or more bits of the bit map correspond to a respective cell. In some examples, the cell bit map may map include the following: {first cell DTX/DRX ID, second cell DTX/DRX ID, third cell DTX/DRX ID}. In such examples, the RRC signaling maps a single bit to a single cell activation state 510 in accordance with joint DTX/DRX configuration. As such, if the multi-cell activation configuration 500-*a* indicates {1, 0, 1} that may indicate the joint DTX/DRX is activated for the first cell and third cell, and joint DTX/DRX is deactivated for the second cell. In some other examples, the cell bit map may map include the following: {first cell DTX ID, first cell DRX ID, second cell DTX ID, second cell DRX ID, third cell DTX ID, third cell DRX ID}. In such examples, the RRC signaling maps a two bits to each cell activation state 510 in accordance with separate DTX and DRX configuration per cell. As such, if the multi-cell activation configuration 500-*a* indicates {1, 0, 1, 1, 0, 1} that may indicate that cell DTX is active and cell DRX is inactive for the first cell, that cell DTX is active and cell DRX is active for the second cell, and that cell DTX is inactive and cell DRX is active for the third cell. If a UE 115 receives cell DTX/DRX information for a cell the UE 115 is not connected to, the UE 115 may ignore the information.

As illustrated in FIG. 5B, the multi-cell activation configuration 500-*b* may include a ES-RNTI 505-*b*. As described with reference to FIG. 3, the ES-RNTI 505-*b* may be an identifier corresponding to one or more UEs 115 associated with the network entity 105. As such, the ES-RNTI 505-*b* may indicate which UEs 115 may apply the cell DTX/DRX information included in the multi-cell activation configuration 500-*b*. Additionally, the multi-cell activation configuration 500-*b* may include multiple cell activation states 510 corresponding to respective frequencies 525. For instance, each frequency 525 may correspond to a respective cell of the network entity (e.g., frequency 525-*a* corresponds to first cell and frequency 525-*b* corresponds to a second cell). As such, the multi-cell activation configuration 500-*b* may include information for each frequency 525. For example, the frequency information may include a bandwidth part (BWP) associated with a given frequency 525, one or more physical resource blocks (PRBs) associated with the given frequency 525, or a carrier where the central frequency of the carrier is the given frequency 525.

As such, the frequency 525 may be indicated explicitly in the multi-cell activation configuration 500-*b* or may be indicated implicitly via RRC signaling. In examples of explicit frequency indication, the multi-cell activation configuration 500-*b* may indicate the frequency 525 and one or more bits associated with the DTX state and DRX state for the frequency 525. For example, the multi-cell activation configuration 500-*b* may include indication of frequency 525-*a*, a single bit indicating DTX activation state 515-*a*, and a single bit indicating DTX activation state 520-*a*. Additionally, the multi-cell activation configuration 500-*b* may include indication of frequency 525-*b*, a single bit indicating DTX activation state 515-*b*, and a single bit indicating DTX activation state 520-*b*.

In examples of implicit frequency indication, the network entity 105 may configure a frequency DTX/DRX bit map. For example, the network entity 105 may transmit RRC signaling configuring the frequency bit map where one or more bits of the bit map correspond to a respective frequency 525. In some examples, the frequency bit map may include the following: {frequency 525-*a* DTX/DRX ID, frequency 525-*b* DTX/DRX ID}. In such examples, the RRC signaling maps a single bit to each of frequency 525-*a* and 525-*b* in accordance with joint DTX/DRX configuration. As such, if the multi-cell activation configuration 500-*b* indicates {1, 0} that may indicate the joint DTX/DRX is activated for the frequency 525-*a*, and joint DTX/DRX is deactivated for the frequency 525-*b*. In some other examples, the frequency bit map may include the following: {frequency 525-*a* DTX ID, frequency 525-*a* DRX ID, frequency 525-*b* DTX ID, frequency 525-*b* DRX ID}. In such examples, the RRC signaling maps two bits to each frequency 525 in accordance with separate DTX and DRX configuration per cell. As such, if the multi-cell activation configuration 500-*b* indicates {1, 0, 1, 1} that may indicate that DTX is active and DRX is inactive for the frequency 525-*a*, and that DTX is active and DRX is active for the frequency 525-*b*.

In some cases of multi-cell activation configuration 500-*a* and 500-*b*, the cell or frequency configuration information may be included in the SI associated with each cell (e.g., SIB1, SIB2, or SIB4). That is, SIB1, SIB2, SIB4, or any combination may indicate multi-cell activation configuration 500-*a* and 500-*b*.

Figure 6:
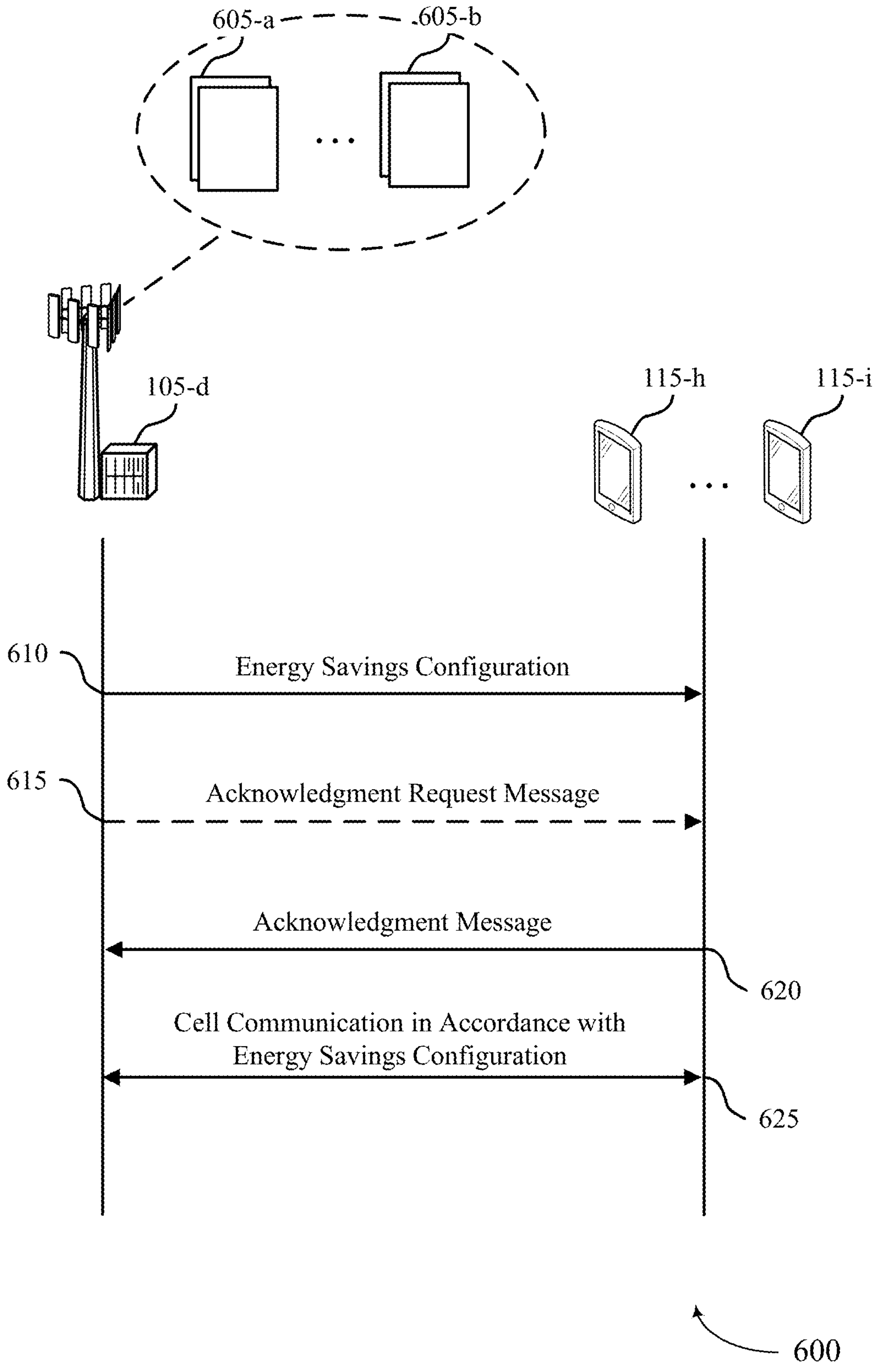
FIGS. 6 through 8 each show a respective example of a process flow that supports techniques for cell DRX and DTX state activation in accordance with one or more aspects of the present disclosure.

FIG. 6 shows an example of a process flow 600 that supports techniques for cell DRX and DTX state activation in accordance with one or more aspects of the present disclosure. In some examples, process flow 600 may implement aspects of wireless communications system 100 and 200. Process flow 600 includes a UE 115-*h* through UE 115-*i* and a network entity 105-*d* which may be respective examples of UEs 115 and a network entity 105, as described with reference to FIGS. 1 and 2. As illustrated, the network entity 105-*d* may include one or more cells 605 (e.g., cell 605-*a* and cell 605-*b*), which the network entity 105-*d* may use to communicate with the UEs 115-*h* through UE 115-*i*. Alternative examples of the following may be implemented, where some steps are performed in a different order than described or are not performed at all. In some cases, steps may include additional features not mentioned below, or further steps may be added. In addition, it should be understood that these processes may occur between any quantity of network devices and network device types. For example, the network entity 105-*d* may communicate with any quantity of UEs 115 using any quantity of cells 605.

At 610, each of UEs 115-*h* through 115-*i* may receive from a first activated cell 605 of the network entity, an energy savings configuration. For example, the UEs 115-*h* through 115-*i* may receive control signaling that indicates the energy savings configuration for discontinuous cycles for one or more second cells 605 of the network entity. In some examples, the energy savings configuration may include a DTX activation state for each cell 605 of the one or more second cells 605, a DRX activation state for each cell 605 of the one or more second cells 605, or both. In some cases, the control signaling may be DCI of format 2_6 include a CRC scrambled with a ES-RNTI. In such cases, the ES-RNTI may be associated with each of UEs 115-*h* through 115-*i*.

In some examples, at 615, each of UEs 115-*h* through 115-*i* may receive an acknowledgment request message. For instance, the UEs 115-*h* through 115-*i* may receive a request to transmit the MAC-CE that includes the cell map (e.g., in accordance with Table 1). In some cases, the cell map may indicate which cells 605 of the one or more second cells 605 have been activated or deactivated in accordance with the energy savings configuration.

At 620, each of the UEs 115-*h* though 115-*i* may transmit respective acknowledgment messages indicating which cells 605 of the one or more second cells 605 have been activated or deactivated in accordance with the energy savings configuration. In some examples, each respective acknowledgment message may include a HARQ ACK/NACK response and an HPN of the HARQ. In some examples, the HPN indicates which cells 605 of the one or more cells 605 have been activated or deactivated in accordance with the energy savings configuration.

Additionally, or alternatively, if the UEs 115-*h* though 115-*i* receive the request to transmit the MAC-CE that includes the cell map (e.g., at 615), then the respective acknowledgment messages may include the MAC-CE that indicates which cells 605 of the one or more cells 605 have been activated or deactivated in accordance with the energy savings configuration.

At 625, the UEs 115-*h* though 115-*i* may communicate with the one or more second cells 605 during the discontinuous cycles in accordance with the energy savings configuration.

Figure 7:
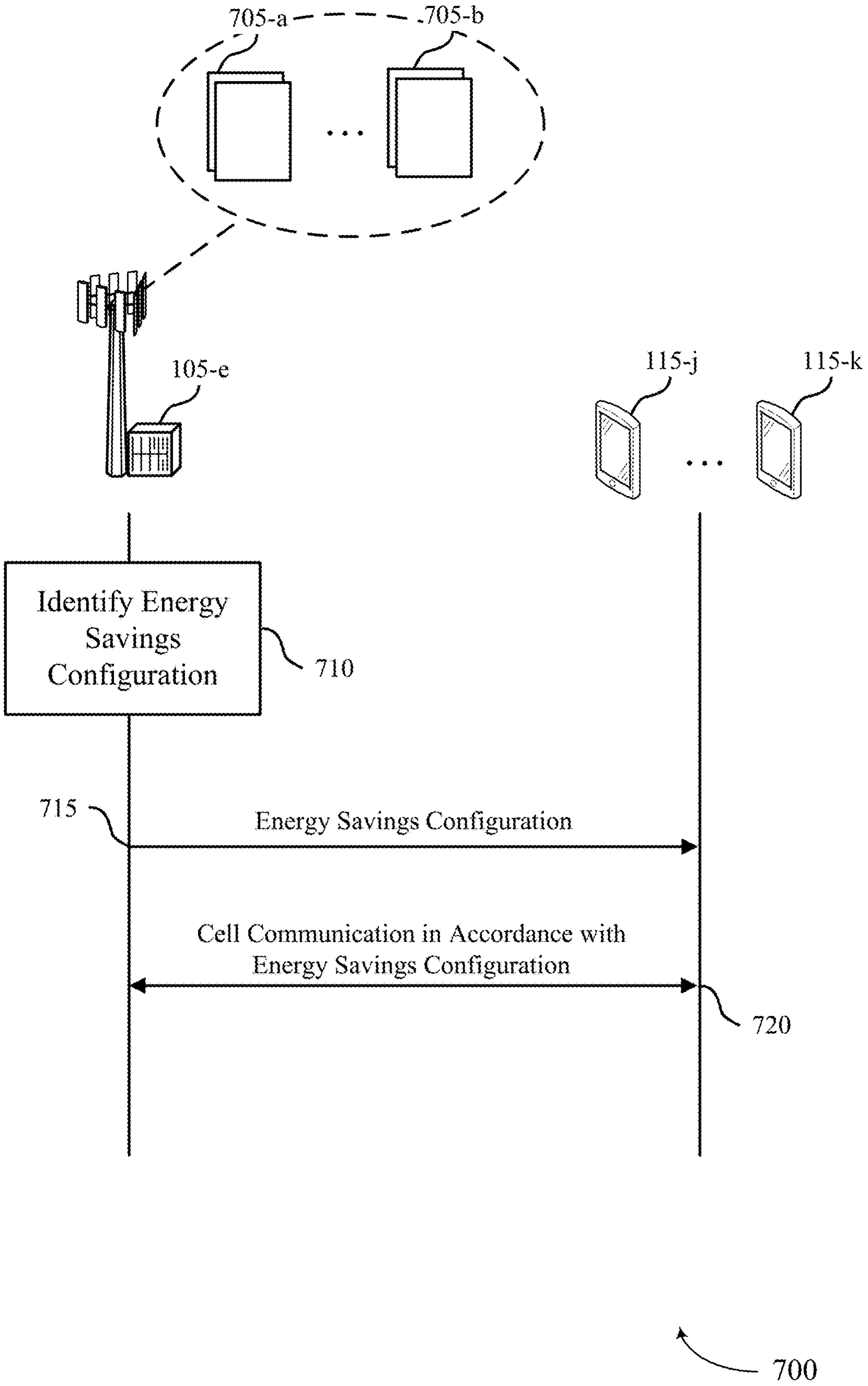

FIG. 7 shows an example of a process flow 700 that supports techniques for cell DRX and DTX state activation in accordance with one or more aspects of the present disclosure. In some examples, process flow 700 may implement aspects of wireless communications system 100 and 200. Process flow 700 includes a UE 115-*j* through UE 115-*k* and a network entity 105-*e* which may be respective examples of UEs 115 and a network entity 105, as described with reference to FIGS. 1 and 2. As illustrated, the network entity 105-*e* may include one or more cells 705 (e.g., cell 705-*a* and cell 705-*b*), which the network entity 105-*e* may use to communicate with the UEs 115-*j* through UE 115-*k*. Alternative examples of the following may be implemented, where some steps are performed in a different order than described or are not performed at all. In some cases, steps may include additional features not mentioned below, or further steps may be added. In addition, it should be understood that these processes may occur between any quantity of network devices and network device types. For example, the network entity 105-*e* may communicate with any quantity of UEs 115 using any quantity of cells 705.

At 710, the network entity 105-*e* may identify an energy savings configuration for a discontinuous cycle of a cell 705 associated with the network entity 105-*e*. In some examples, the energy savings configuration may include a DTX activation state of the cell 705, a DRX activation state of the cell 705, or both for the discontinuous cycle.

At 715, the network entity 105-*e* may transmit to UEs 115-*j* through 115-*k* control signaling that indicates the energy savings configuration for the discontinuous cycle. In some cases, the control signaling may be DCI of format 2_6 including a CRC scrambled with an ES-RNTI. In such cases, the ES-RNTI may be associated with each of UEs 115-*h* through 115-*i*.

In some examples, the control signaling may indicate, via DCI of a power saving monitoring procedure, the energy savings configuration for the discontinuous cycle prior to the discontinuous cycle.

In some examples, the network entity 105-*e* may transmit as part of the control signaling, an ES-RNTI that is associated with each UE of the UEs 115-*j* through 115-*k*. In some examples, the ES-RNTI may indicate that the UEs 115-*j* through 115-*k* are separated into subsets of UEs. As such, the ES-RNTI may include a respective UE group indicator for each respective subset of UEs. In some examples, a given UE group indicator may include at least a timing offset for the respective subset of UEs, the timing offset indicating a duration of time after a start of the discontinuous cycle for the respective subset of UEs to wait before communicating with the cell 705. Additionally, or alternatively, each respective UE group indicator may include an activation status of the respective subset of UEs, a duration of the activation status, and a periodicity associated with activation of the respective subset of UEs. In some examples, respective subsets of UEs and the respective UE group indicators may be based on the energy savings configuration. That is, the network entity 105-*e* may configure different subsets of UEs, and different respective UE group indicators based on the DTX activation state of the cell 705, the DRX activation state of the cell 705, or both.

In some examples, the control signaling may include an indication for the UEs 115-*j* through 115-*k* to apply a cell DTX cycle or a cell DRX cycle for the discontinuous cycle. In some examples, the control signaling may include an indication for a duration of the discontinuous cycle. In some examples, the UEs 115-*j* through 115-*k* may apply the energy savings configuration until receiving an indication that says otherwise. That is, the network entity 105-*e* may transmit second control signaling deactivating the energy savings configuration, where the energy savings configuration is applied at UEs 115-*j* through 115-*k* until transmitting the second control signaling. In some examples, the control signaling may indicate for the UEs 115-*j* through 115-*k* to apply the energy savings configuration to the next discontinuous cycle or to a quantity of discontinuous cycles.

In some examples, the control signaling may include an indication of whether CSI reporting at UEs 115-*j* through 115-*k* is activated or deactivated during a quantity of discontinuous cycles that includes the discontinuous cycle. Additionally, or alternatively, the control signaling may include an indication of whether RSRP reporting at UEs 115-*j* through 115-*k* is activated or deactivated during a quantity of discontinuous cycles that includes the discontinuous cycle.

At 720, the network entity 105-*e* may communicate, during the discontinuous cycle, with one or more UEs 115 of the UEs 115-*j* through 115-*k* in accordance with the energy savings configuration.

Figure 8:
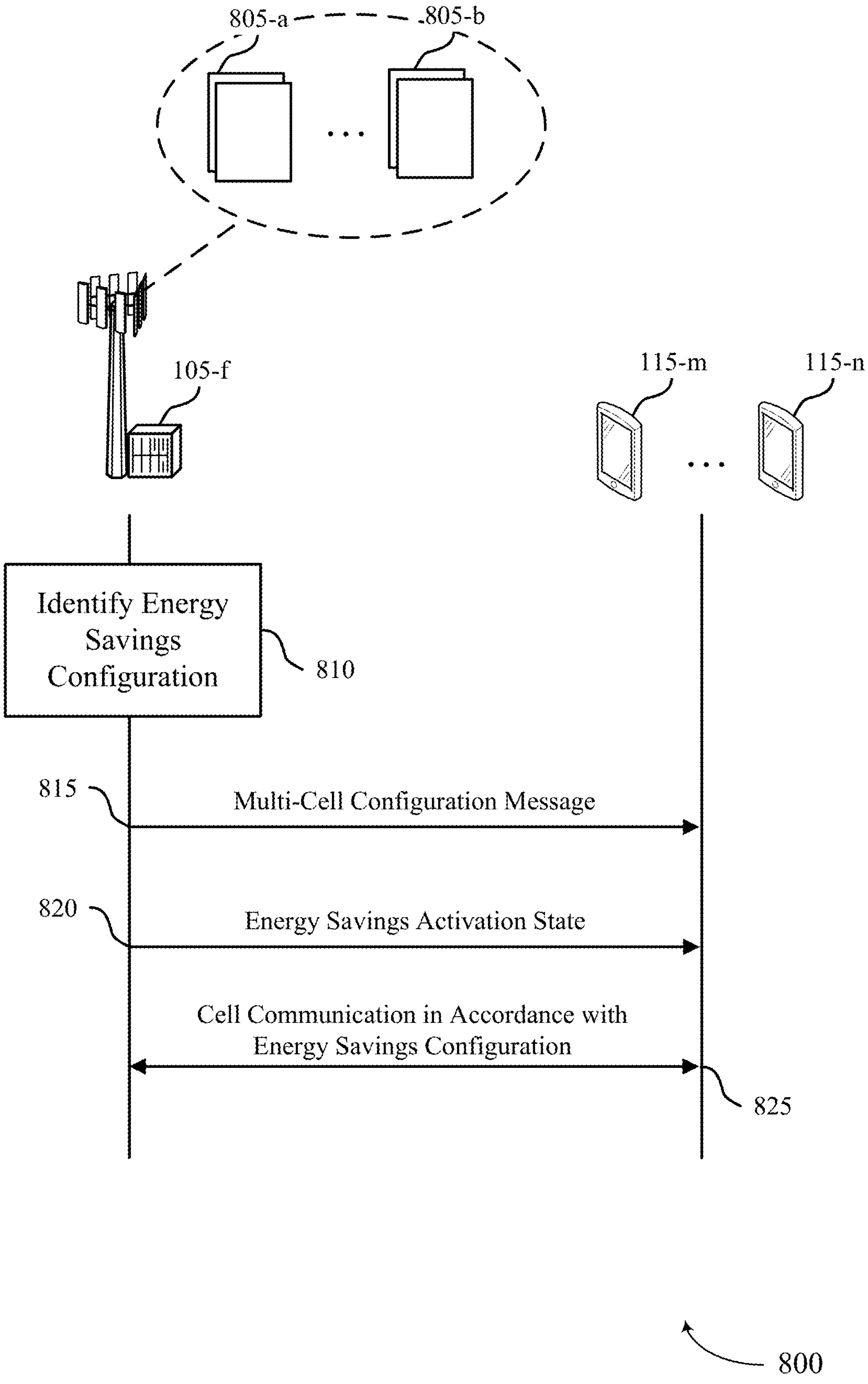

FIG. 8 shows an example of a process flow 800 that supports techniques for cell DRX and DTX state activation in accordance with one or more aspects of the present disclosure. In some examples, process flow 800 may implement aspects of wireless communications system 100 and 200. Process flow 800 includes a UE 115-*m* through UE 115-*n* and a network entity 105-*f* which may be respective examples of UEs 115 and a network entity 105, as described with reference to FIGS. 1 and 2. As illustrated, the network entity 105-*f* may include one or more cells 805 (e.g., cell 805-*a* and cell 805-*b*), which the network entity 105-*f* may use to communicate with the UEs 115-*m* through UE 115-*n*. Alternative examples of the following may be implemented, where some steps are performed in a different order than described or are not performed at all. In some cases, steps may include additional features not mentioned below, or further steps may be added. In addition, it should be understood that these processes may occur between any quantity of network devices and network device types. For example, the network entity 105-*f* may communicate with any quantity of UEs 115 using any quantity of cells 805.

At 810, the network entity 105-*f* may identify at a first cell 805 of the network entity 105-*f*, an energy savings configuration for a set of cells 805 associated with the network entity 105-*f*. In some examples, the energy savings configuration may include a respective DTX activation state for one or more cells 805 of the set of cells 805, a DRX activation state for the one or more cells 805 of the set of cells 805, or both.

At 815, the network entity 105-*f* may transmit a multi-cell configuration message. For example, the network entity 105-*f* may transmit one or more control messages indicating a cell bit map, where each bit of the cell bit map is associated with a DTX activation state of a given cell 805 of the one or more cells 805, a DRX activation state of the given cell, or both. In some examples of transmitting the one or more control messages, the network entity 105-*f* may transmit, via broadcast, RRC signaling that includes the cell bit map to each of UEs 115-*m* through 115-*n*. In some examples of transmitting the one or more control messages, the network entity 105-*f* may transmit via unicast, a respective MACE-CE message to each of UEs 115-*m* through 115-*n*, where each respective MAC-CE message includes the cell bit map.

In some other examples, the one or more control messages may indicate a frequency bit map, where each bit of the frequency bit map is associated with a DTX activation state of a given cell 805 of the one or more cells 805, a DRX activation state of the given cell, or both.

At 820, the network entity 105-*f* may transmit an energy activation state. For example, the network entity 105-*f* may transmit to UEs 115-*m* through 115-*n* via the first cell, control signaling that indicates the energy savings activation state for the one or more cells 805 of the set of cells 805.

In some examples, the control signaling may include a respective cell ID for each cell 805 of the set of cells 805, where the respective DTX activation state and the respective DRX activation state for a given cell 805 of the set of cells 805 corresponds to the respective cell ID of the given cell. In such examples, SIB1 of an SI message may include each respective cell ID, each respective DTX activation state, and each respective DRX activation state. In some examples, the control signaling may include the cell bit map (e.g., configured at 815).

In some examples, the control signaling may include respective set of bits associated with a respective frequency, where a first bit for a given set of bits indicates a DTX activation state of an associated frequency, and a second bit of the given set of bits indicates a DRX activation state of the associated frequency. In some examples, the control signaling may include the frequency bit map (e.g., configured at 815).

At 825, the network entity 105-*f* may communicate via the set of cells 805, with the one or more UEs of the set of UEs in accordance with the energy savings activation state.

Figure 9:
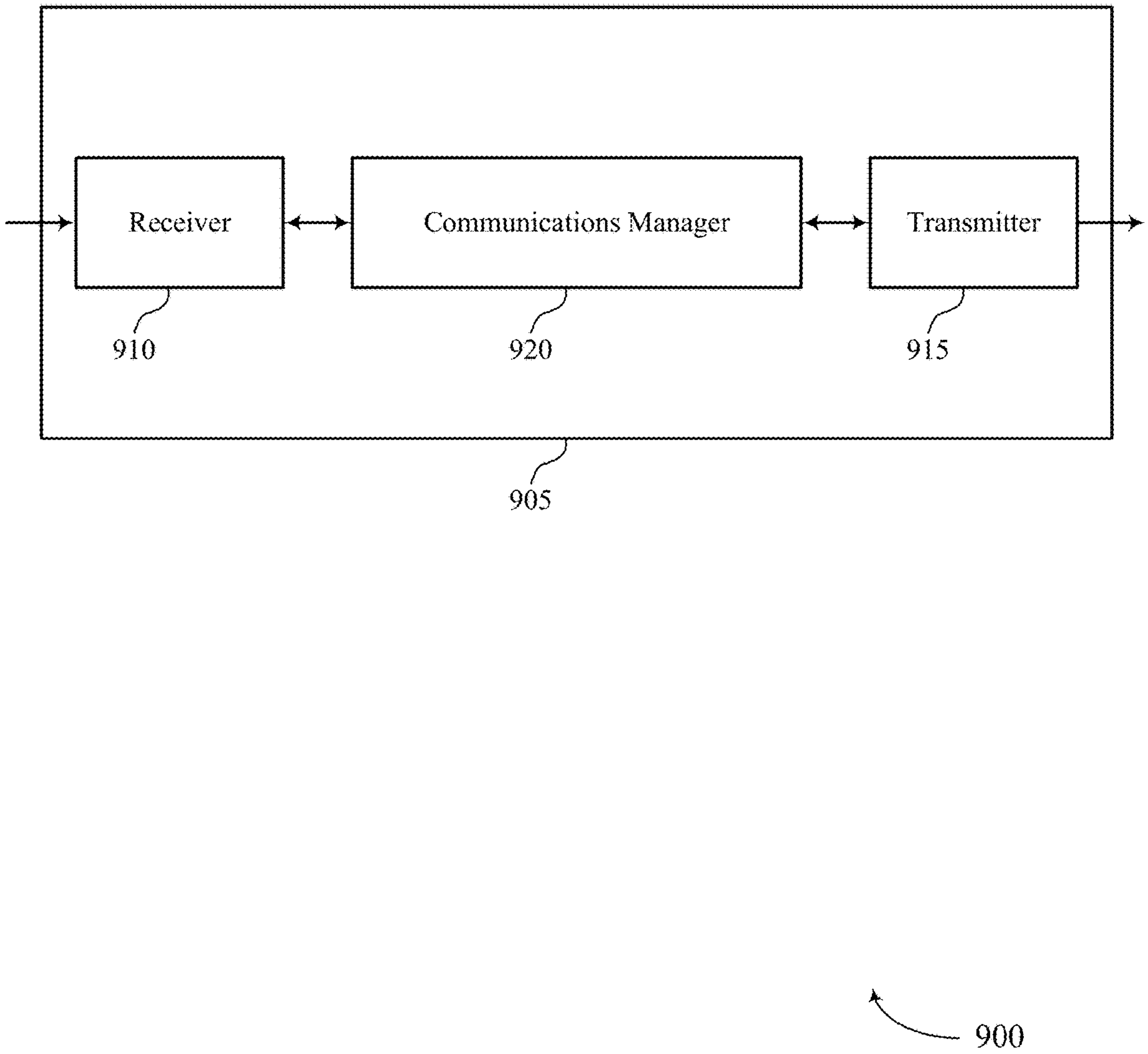
FIGS. 9 and 10 show block diagrams of devices that support techniques for cell DRX and DTX state activation in accordance with one or more aspects of the present disclosure.

FIG. 9 shows a block diagram 900 of a device 905 that supports techniques for cell DRX and DTX state activation in accordance with one or more aspects of the present disclosure. The device 905 may be an example of aspects of a UE 115 as described herein. The device 905 may include a receiver 910, a transmitter 915, and a communications manager 920. The device 905, or one or more components of the device 905 (e.g., the receiver 910, the transmitter 915, and the communications manager 920), may include at least one processor, which may be coupled with at least one memory, to support the described techniques. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for cell DRX and DTX state activation). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for cell DRX and DTX state activation). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of techniques for cell DRX and DTX state activation as described herein. For example, the communications manager 920, the receiver 910, the transmitter 915, or various combinations or components thereof may be capable of performing one or more of the functions described herein.

In some examples, the communications manager 920, the receiver 910, the transmitter 915, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by executing, by the at least one processor, instructions stored in the at least one memory).

Additionally, or alternatively, the communications manager 920, the receiver 910, the transmitter 915, or various combinations or components thereof may be implemented in code (e.g., as communications management software or firmware) executed by at least one processor. If implemented in code executed by at least one processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications in accordance with examples as disclosed herein. For example, the communications manager 920 is capable of, configured to, or operable to support a means for receiving, from a first activated cell of a network entity, control signaling that indicates an energy savings configuration for discontinuous cycles for one or more second cells of the network entity, the energy savings configuration including a DTX activation state for each cell of the one or more second cells, a DRX activation state for each cell of the one or more second cells, or both. The communications manager 920 is capable of, configured to, or operable to support a means for transmitting, to the first activated cell of the network entity, an acknowledgment message indicating which cells of the one or more second cells have been activated or deactivated in accordance with the energy savings configuration. The communications manager 920 is capable of, configured to, or operable to support a means for communicating with the one or more second cells during the discontinuous cycles in accordance with the energy savings configuration.

By including or configuring the communications manager 920 in accordance with examples as described herein, the device 905 (e.g., at least one processor controlling or otherwise coupled with the receiver 910, the transmitter 915, the communications manager 920, or a combination thereof) may support techniques for cell DTX/DRX activation and deactivation which may result in reduced processing, reduced power consumption, and more efficient utilization of communication resources.

Figure 10:
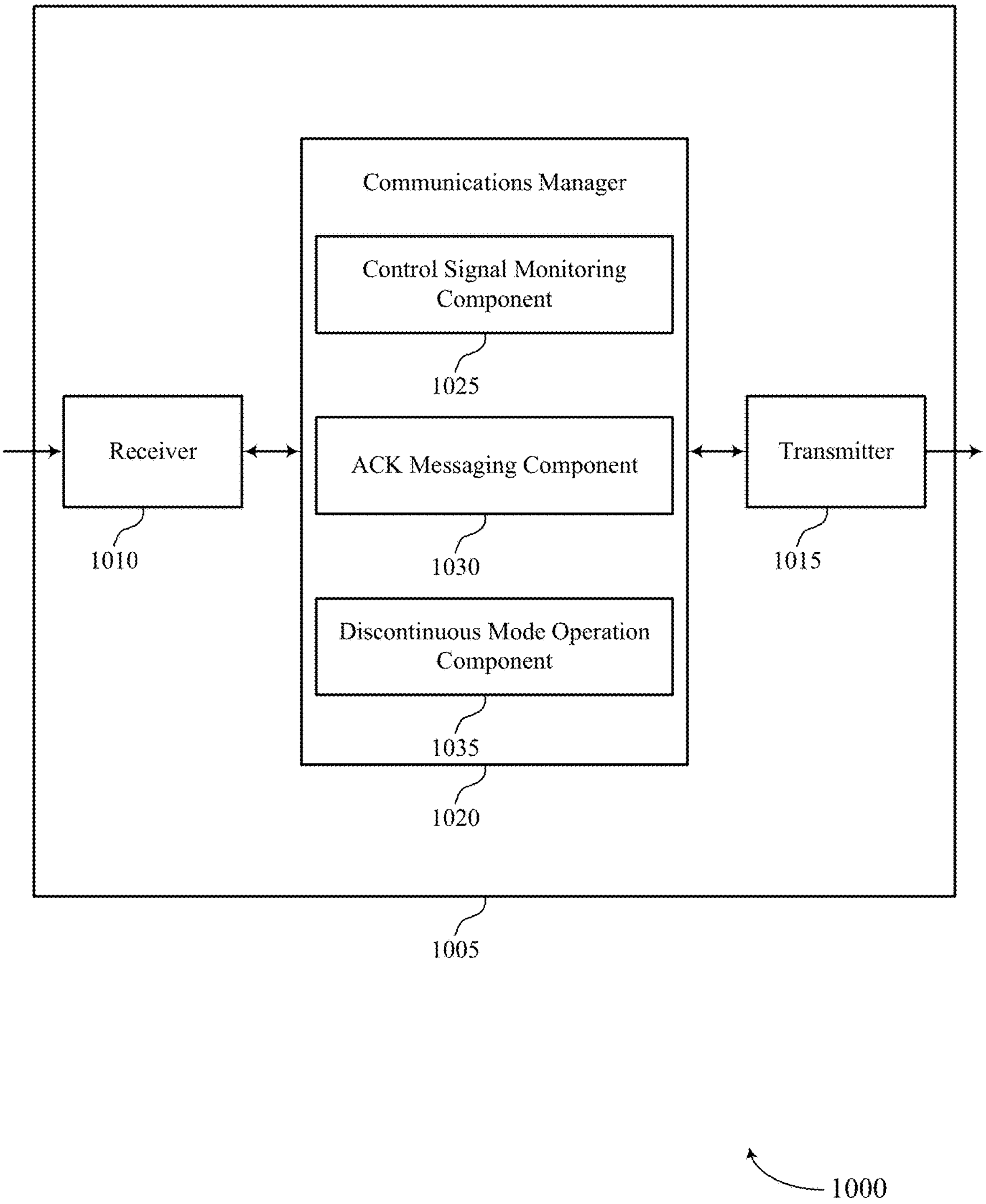

FIG. 10 shows a block diagram 1000 of a device 1005 that supports techniques for cell DRX and DTX state activation in accordance with one or more aspects of the present disclosure. The device 1005 may be an example of aspects of a device 905 or a UE 115 as described herein. The device 1005 may include a receiver 1010, a transmitter 1015, and a communications manager 1020. The device 1005, or one or more components of the device 1005 (e.g., the receiver 1010, the transmitter 1015, and the communications manager 1020), may also include at least one processor, which may be coupled with at least one memory, to support the described techniques. Each of these components may be in communication with one another (e.g., via one or more buses).

The receiver 1010 may provide a means for receiving information such as packets, user data, control information, or any combination thereof associated with various information channels (e.g., control channels, data channels, information channels related to techniques for cell DRX and DTX state activation). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to techniques for cell DRX and DTX state activation). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of techniques for cell DRX and DTX state activation as described herein. For example, the communications manager 1020 may include a control signal monitoring component 1025, an ACK messaging component 1030, a discontinuous mode operation component 1035, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications in accordance with examples as disclosed herein. The control signal monitoring component 1025 is capable of, configured to, or operable to support a means for receiving, from a first activated cell of a network entity, control signaling that indicates an energy savings configuration for discontinuous cycles for one or more second cells of the network entity, the energy savings configuration including a DTX activation state for each cell of the one or more second cells, a DRX activation state for each cell of the one or more second cells, or both. The ACK messaging component 1030 is capable of, configured to, or operable to support a means for transmitting, to the first activated cell of the network entity, an acknowledgment message indicating which cells of the one or more second cells have been activated or deactivated in accordance with the energy savings configuration. The discontinuous mode operation component 1035 is capable of, configured to, or operable to support a means for communicating with the one or more second cells during the discontinuous cycles in accordance with the energy savings configuration.

Figure 11:
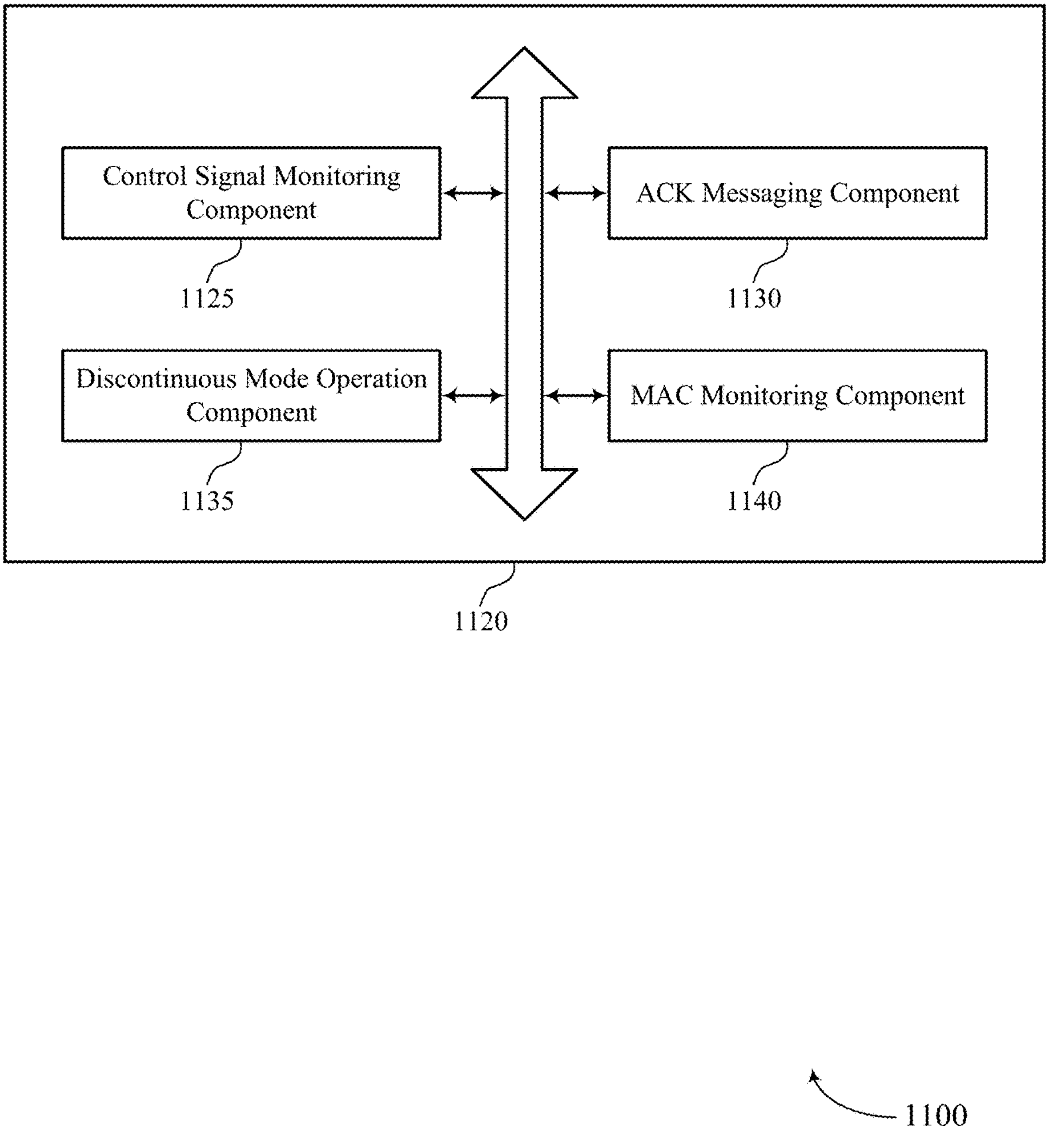
FIG. 11 shows a block diagram of a communications manager that supports techniques for cell DRX and DTX state activation in accordance with one or more aspects of the present disclosure.

FIG. 11 shows a block diagram 1100 of a communications manager 1120 that supports techniques for cell DRX and DTX state activation in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of techniques for cell DRX and DTX state activation as described herein. For example, the communications manager 1120 may include a control signal monitoring component 1125, an ACK messaging component 1130, a discontinuous mode operation component 1135, a MAC monitoring component 1140, or any combination thereof. Each of these components, or components of subcomponents thereof (e.g., one or more processors, one or more memories), may communicate, directly or indirectly, with one another (e.g., via one or more buses).

The communications manager 1120 may support wireless communications in accordance with examples as disclosed herein. The control signal monitoring component 1125 is capable of, configured to, or operable to support a means for receiving, from a first activated cell of a network entity, control signaling that indicates an energy savings configuration for discontinuous cycles for one or more second cells of the network entity, the energy savings configuration including a DTX activation state for each cell of the one or more second cells, a DRX activation state for each cell of the one or more second cells, or both. The ACK messaging component 1130 is capable of, configured to, or operable to support a means for transmitting, to the first activated cell of the network entity, an acknowledgment message indicating which cells of the one or more second cells have been activated or deactivated in accordance with the energy savings configuration. The discontinuous mode operation component 1135 is capable of, configured to, or operable to support a means for communicating with the one or more second cells during the discontinuous cycles in accordance with the energy savings configuration.

In some examples, the acknowledgment message includes a HARQ. In some examples, a process number of the HARQ indicates which cells of the one or more second cells have been activated or deactivated in accordance with the energy savings configuration.

In some examples, transmitting the acknowledgment message includes transmitting, as part of the acknowledgment message, a MAC-CE including a cell map that indicates which cells of the one or more second cells have been activated or deactivated in accordance with the energy savings configuration.

In some examples, the MAC monitoring component 1140 is capable of, configured to, or operable to support a means for receiving, from the first activated cell, a request to transmit the MAC-CE including the cell map, where transmitting the MAC-CE including the cell map that indicates which cells of the one or more second cells have been activated or deactivated is based on receiving the request.

Figure 12:
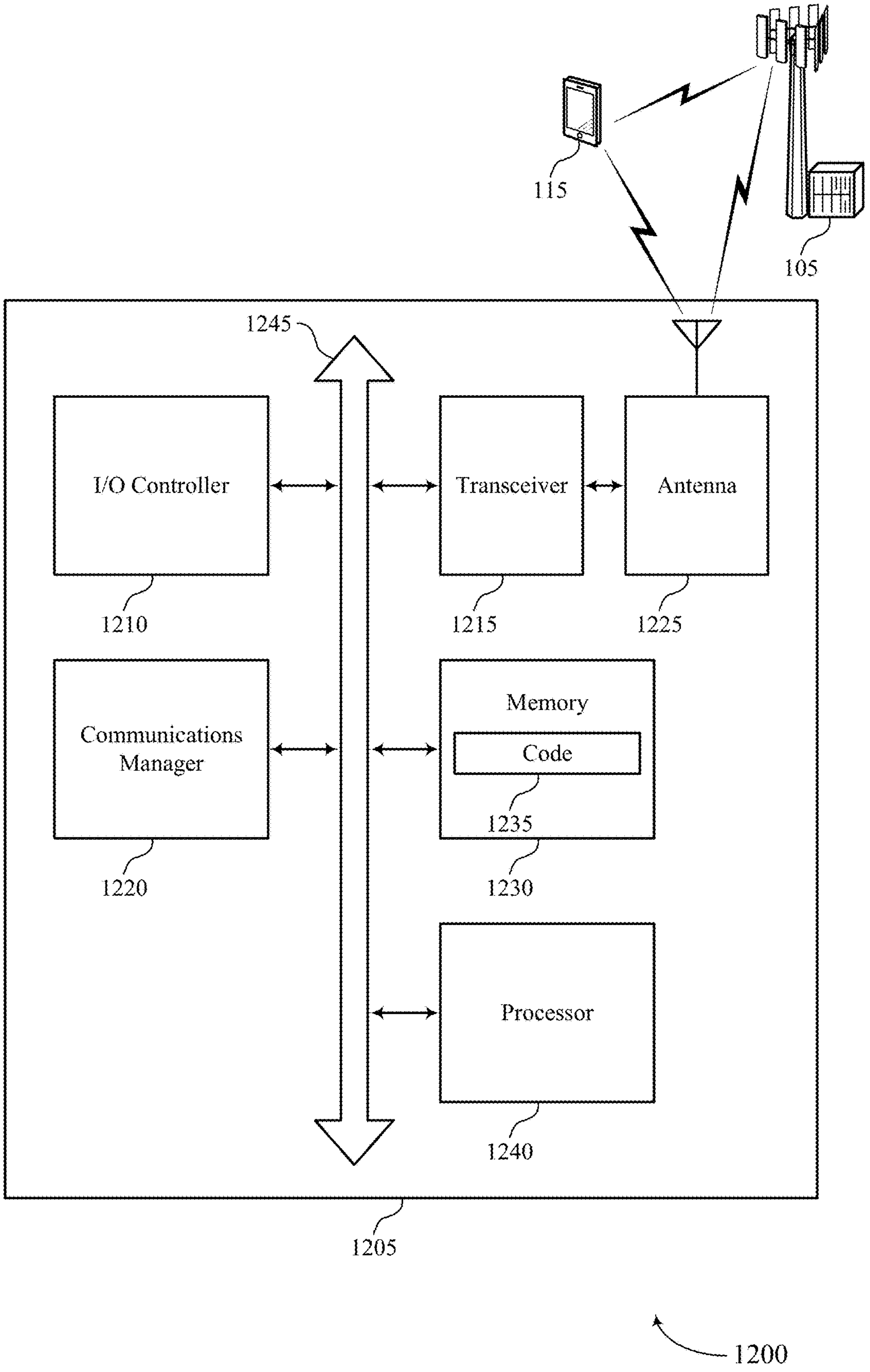
FIG. 12 shows a diagram of a system including a device that supports techniques for cell DRX and DTX state activation in accordance with one or more aspects of the present disclosure.

FIG. 12 shows a diagram of a system 1200 including a device 1205 that supports techniques for cell DRX and DTX state activation in accordance with one or more aspects of the present disclosure. The device 1205 may be an example of or include the components of a device 905, a device 1005, or a UE 115 as described herein. The device 1205 may communicate (e.g., wirelessly) with one or more network entities 105, one or more UEs 115, or any combination thereof. The device 1205 may include components for bi-directional voice and data communications including components for transmitting and receiving communications, such as a communications manager 1220, an input/output (I/O) controller 1210, a transceiver 1215, an antenna 1225, a memory 1230, code 1235, and a processor 1240. These components may be in electronic communication or otherwise coupled (e.g., operatively, communicatively, functionally, electronically, electrically) via one or more buses (e.g., a bus 1245).

The I/O controller 1210 may manage input and output signals for the device 1205. The I/O controller 1210 may also manage peripherals not integrated into the device 1205. In some cases, the I/O controller 1210 may represent a physical connection or port to an external peripheral. In some cases, the I/O controller 1210 may utilize an operating system such as iOS®, ANDROID®, MS-DOS®, MS-WINDOWS®, OS/2®, UNIX®, LINUX®, or another known operating system. Additionally, or alternatively, the I/O controller 1210 may represent or interact with a modem, a keyboard, a mouse, a touchscreen, or a similar device. In some cases, the I/O controller 1210 may be implemented as part of one or more processors, such as the at least one processor 1240. In some cases, a user may interact with the device 1205 via the I/O controller 1210 or via hardware components controlled by the I/O controller 1210.

In some cases, the device 1205 may include a single antenna 1225. However, in some other cases, the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The at least one memory 1230 may include random access memory (RAM) and read-only memory (ROM). The at least one memory 1230 may store computer-readable, computer-executable code 1235 including instructions that, when executed by the at least one processor 1240, cause the device 1205 to perform various functions described herein. The code 1235 may be stored in a non-transitory computer-readable medium such as system memory or another type of memory. In some cases, the code 1235 may not be directly executable by the at least one processor 1240 but may cause a computer (e.g., when compiled and executed) to perform functions described herein. In some cases, the at least one memory 1230 may contain, among other things, a basic I/O system (BIOS) which may control basic hardware or software operation such as the interaction with peripheral components or devices.

The at least one processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 1240 may be configured to operate a memory array using a memory controller. In some other cases, a memory controller may be integrated into the at least one processor 1240. The at least one processor 1240 may be configured to execute computer-readable instructions stored in a memory (e.g., the at least one memory 1230) to cause the device 1205 to perform various functions (e.g., functions or tasks supporting techniques for cell DRX and DTX state activation). For example, the device 1205 or a component of the device 1205 may include at least one processor 1240 and at least one memory 1230 coupled with or to the at least one processor 1240, the at least one processor 1240 and at least one memory 1230 configured to perform various functions described herein. In some examples, the at least one processor 1240 may include multiple processors and the at least one memory 1230 may include multiple memories. One or more of the multiple processors may be coupled with one or more of the multiple memories, which may, individually or collectively, be configured to perform various functions herein.

The communications manager 1220 may support wireless communications in accordance with examples as disclosed herein. For example, the communications manager 1220 is capable of, configured to, or operable to support a means for receiving, from a first activated cell of a network entity, control signaling that indicates an energy savings configuration for discontinuous cycles for one or more second cells of the network entity, the energy savings configuration including a DTX activation state for each cell of the one or more second cells, a DRX activation state for each cell of the one or more second cells, or both. The communications manager 1220 is capable of, configured to, or operable to support a means for transmitting, to the first activated cell of the network entity, an acknowledgment message indicating which cells of the one or more second cells have been activated or deactivated in accordance with the energy savings configuration. The communications manager 1220 is capable of, configured to, or operable to support a means for communicating with the one or more second cells during the discontinuous cycles in accordance with the energy savings configuration.

By including or configuring the communications manager 1220 in accordance with examples as described herein, the device 1205 may support techniques for cell DTX/DRX activation and deactivation which may result in improved communication reliability, reduced latency, improved user experience related to reduced processing, reduced power consumption, more efficient utilization of communication resources, improved coordination between devices, longer battery life, and improved utilization of processing capability.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the at least one processor 1240, the at least one memory 1230, the code 1235, or any combination thereof. For example, the code 1235 may include instructions executable by the at least one processor 1240 to cause the device 1205 to perform various aspects of techniques for cell DRX and DTX state activation as described herein, or the at least one processor 1240 and the at least one memory 1230 may be otherwise configured to, individually or collectively, perform or support such operations.

Figure 13:
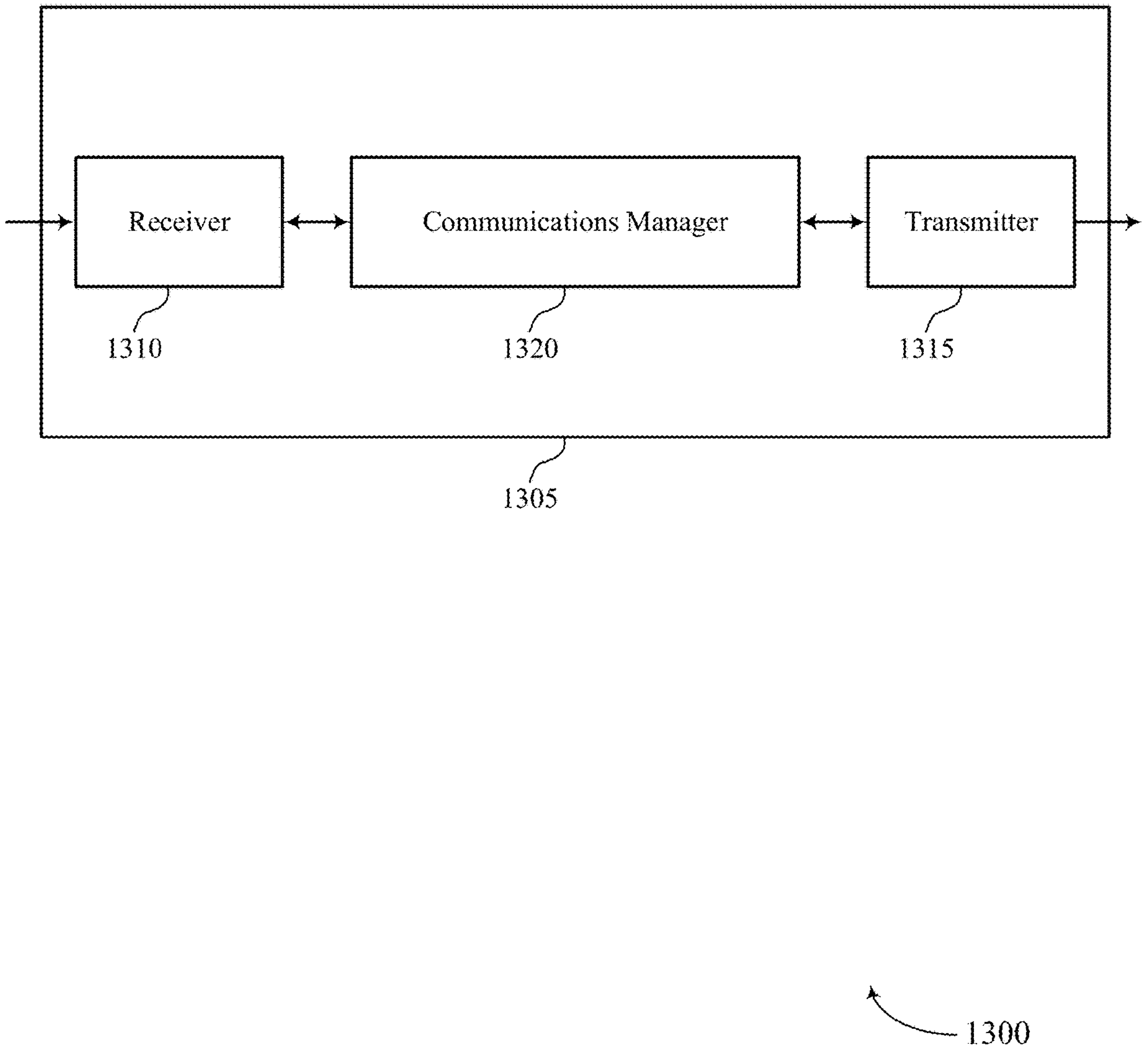
FIGS. 13 and 14 show block diagrams of devices that support techniques for cell DRX and DTX state activation in accordance with one or more aspects of the present disclosure.

FIG. 13 shows a block diagram 1300 of a device 1305 that supports techniques for cell DRX and DTX state activation in accordance with one or more aspects of the present disclosure. The device 1305 may be an example of aspects of a network entity 105 as described herein. The device 1305 may include a receiver 1310, a transmitter 1315, and a communications manager 1320. The device 1305, or one or more components of the device 1305 (e.g., the receiver 1310, the transmitter 1315, and the communications manager 1320), may include at least one processor, which may be coupled with at least one memory, to support the described techniques. Each of these components may be in communication with one another (e.g., via one or more buses).

The receiver 1310 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1305. In some examples, the receiver 1310 may support obtaining information by receiving signals via one or more antennas. Additionally, or alternatively, the receiver 1310 may support obtaining information by receiving signals via one or more wired (e.g., electrical, fiber optic) interfaces, wireless interfaces, or any combination thereof.

The transmitter 1315 may provide a means for outputting (e.g., transmitting, providing, conveying, sending) information generated by other components of the device 1305. For example, the transmitter 1315 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1315 may support outputting information by transmitting signals via one or more antennas. Additionally, or alternatively, the transmitter 1315 may support outputting information by transmitting signals via one or more wired (e.g., electrical, fiber optic) interfaces, wireless interfaces, or any combination thereof. In some examples, the transmitter 1315 and the receiver 1310 may be co-located in a transceiver, which may include or be coupled with a modem.

The communications manager 1320, the receiver 1310, the transmitter 1315, or various combinations thereof or various components thereof may be examples of means for performing various aspects of techniques for cell DRX and DTX state activation as described herein. For example, the communications manager 1320, the receiver 1310, the transmitter 1315, or various combinations or components thereof may be capable of performing one or more of the functions described herein.

In some examples, the communications manager 1320, the receiver 1310, the transmitter 1315, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by executing, by the at least one processor, instructions stored in the at least one memory).

Additionally, or alternatively, the communications manager 1320, the receiver 1310, the transmitter 1315, or various combinations or components thereof may be implemented in code (e.g., as communications management software or firmware) executed by at least one processor. If implemented in code executed by at least one processor, the functions of the communications manager 1320, the receiver 1310, the transmitter 1315, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 1320 may be configured to perform various operations (e.g., receiving, obtaining, monitoring, outputting, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to obtain information, output information, or perform various other operations as described herein.

The communications manager 1320 may support wireless communications in accordance with examples as disclosed herein. For example, the communications manager 1320 is capable of, configured to, or operable to support a means for identifying an energy savings configuration for a discontinuous cycle of a cell associated with the network entity, the energy savings configuration including a DTX activation state of the cell, a DRX activation state of the cell, or both for the discontinuous cycle. The communications manager 1320 is capable of, configured to, or operable to support a means for transmitting, to a set of UEs, control signaling that indicates the energy savings configuration for the discontinuous cycle. The communications manager 1320 is capable of, configured to, or operable to support a means for communicating, during the discontinuous cycle, with one or more UEs of the set of UEs in accordance with the energy savings configuration.

Additionally, or alternatively, the communications manager 1320 may support wireless communications in accordance with examples as disclosed herein. For example, the communications manager 1320 is capable of, configured to, or operable to support a means for identifying, at a first cell of the network entity, an energy savings configuration for a set of cells associated with the network entity, the energy savings configuration including a respective DTX activation state for one or more cells of the set of cells, a DRX activation state for the one more cells of the set of cells, or both. The communications manager 1320 is capable of, configured to, or operable to support a means for transmitting, to a set of UEs, control signaling that indicates the energy savings activation state for the one or more cells of the set of cells. The communications manager 1320 is capable of, configured to, or operable to support a means for communicating, via the set of cells, with the one or more UEs of the set of UEs in accordance with the energy savings activation state.

By including or configuring the communications manager 1320 in accordance with examples as described herein, the device 1305 (e.g., at least one processor controlling or otherwise coupled with the receiver 1310, the transmitter 1315, the communications manager 1320, or a combination thereof) may support techniques for cell DTX/DRX activation and deactivation which may result in reduced processing, reduced power consumption, and more efficient utilization of communication resources.

Figure 14:
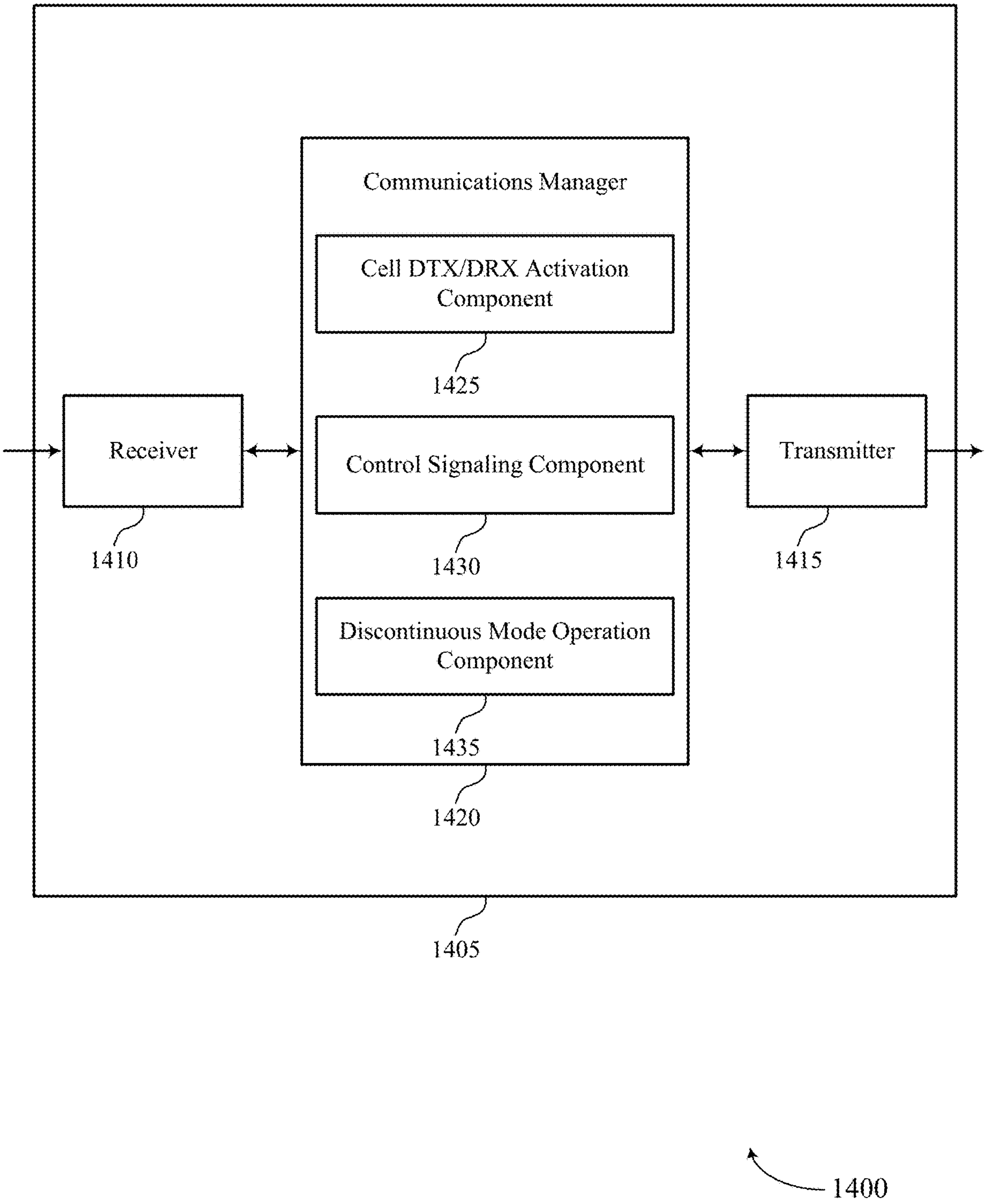

FIG. 14 shows a block diagram 1400 of a device 1405 that supports techniques for cell DRX and DTX state activation in accordance with one or more aspects of the present disclosure. The device 1405 may be an example of aspects of a device 1305 or a network entity 105 as described herein. The device 1405 may include a receiver 1410, a transmitter 1415, and a communications manager 1420. The device 1405, or one or more components of the device 1405 (e.g., the receiver 1410, the transmitter 1415, and the communications manager 1420), may also include at least one processor, which may be coupled with at least one memory, to support the described techniques. Each of these components may be in communication with one another (e.g., via one or more buses).

The receiver 1410 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1405. In some examples, the receiver 1410 may support obtaining information by receiving signals via one or more antennas. Additionally, or alternatively, the receiver 1410 may support obtaining information by receiving signals via one or more wired (e.g., electrical, fiber optic) interfaces, wireless interfaces, or any combination thereof.

The transmitter 1415 may provide a means for outputting (e.g., transmitting, providing, conveying, sending) information generated by other components of the device 1405. For example, the transmitter 1415 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1415 may support outputting information by transmitting signals via one or more antennas. Additionally, or alternatively, the transmitter 1415 may support outputting information by transmitting signals via one or more wired (e.g., electrical, fiber optic) interfaces, wireless interfaces, or any combination thereof. In some examples, the transmitter 1415 and the receiver 1410 may be co-located in a transceiver, which may include or be coupled with a modem.

The device 1405, or various components thereof, may be an example of means for performing various aspects of techniques for cell DRX and DTX state activation as described herein. For example, the communications manager 1420 may include a cell DTX/DRX activation component 1425, a control signaling component 1430, a discontinuous mode operation component 1435, or any combination thereof. The communications manager 1420 may be an example of aspects of a communications manager 1320 as described herein. In some examples, the communications manager 1420, or various components thereof, may be configured to perform various operations (e.g., receiving, obtaining, monitoring, outputting, transmitting) using or otherwise in cooperation with the receiver 1410, the transmitter 1415, or both. For example, the communications manager 1420 may receive information from the receiver 1410, send information to the transmitter 1415, or be integrated in combination with the receiver 1410, the transmitter 1415, or both to obtain information, output information, or perform various other operations as described herein.

The communications manager 1420 may support wireless communications in accordance with examples as disclosed herein. The cell DTX/DRX activation component 1425 is capable of, configured to, or operable to support a means for identifying an energy savings configuration for a discontinuous cycle of a cell associated with the network entity, the energy savings configuration including a DTX activation state of the cell, a DRX activation state of the cell, or both for the discontinuous cycle. The control signaling component 1430 is capable of, configured to, or operable to support a means for transmitting, to a set of UEs, control signaling that indicates the energy savings configuration for the discontinuous cycle. The discontinuous mode operation component 1435 is capable of, configured to, or operable to support a means for communicating, during the discontinuous cycle, with one or more UEs of the set of UEs in accordance with the energy savings configuration.

Additionally, or alternatively, the communications manager 1420 may support wireless communications in accordance with examples as disclosed herein. The cell DTX/DRX activation component 1425 is capable of, configured to, or operable to support a means for identifying, at a first cell of the network entity, an energy savings configuration for a set of cells associated with the network entity, the energy savings configuration including a respective DTX activation state for one or more cells of the set of cells, a DRX activation state for the one more cells of the set of cells, or both. The control signaling component 1430 is capable of, configured to, or operable to support a means for transmitting, to a set of UEs, control signaling that indicates the energy savings activation state for the one or more cells of the set of cells. The discontinuous mode operation component 1435 is capable of, configured to, or operable to support a means for communicating, via the set of cells, with the one or more UEs of the set of UEs in accordance with the energy savings activation state.

Figure 15:
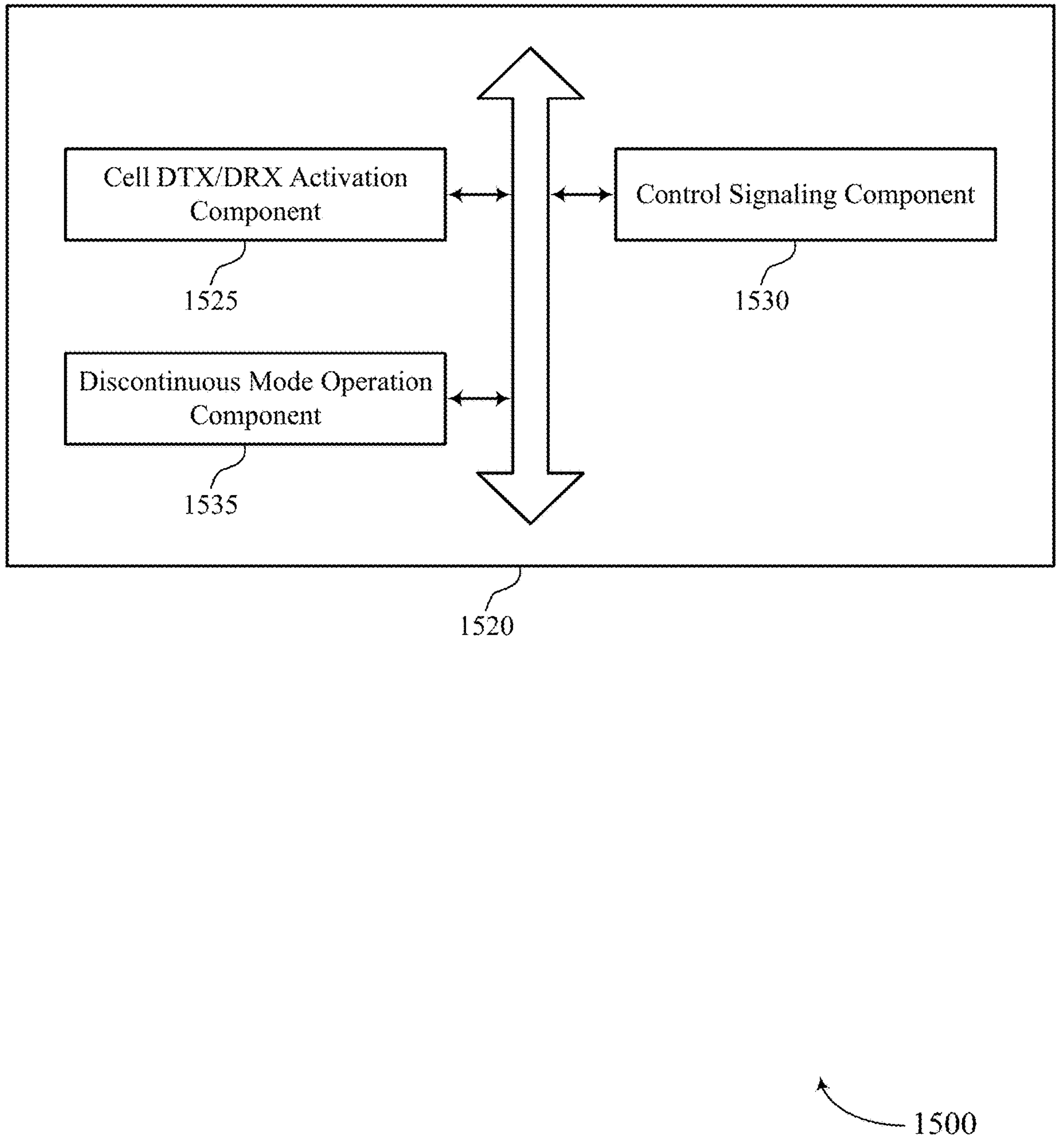
FIG. 15 shows a block diagram of a communications manager that supports techniques for cell DRX and DTX state activation in accordance with one or more aspects of the present disclosure.

FIG. 15 shows a block diagram 1500 of a communications manager 1520 that supports techniques for cell DRX and DTX state activation in accordance with one or more aspects of the present disclosure. The communications manager 1520 may be an example of aspects of a communications manager 1320, a communications manager 1420, or both, as described herein. The communications manager 1520, or various components thereof, may be an example of means for performing various aspects of techniques for cell DRX and DTX state activation as described herein. For example, the communications manager 1520 may include a cell DTX/DRX activation component 1525, a control signaling component 1530, a discontinuous mode operation component 1535, or any combination thereof. Each of these components, or components of subcomponents thereof (e.g., one or more processors, one or more memories), may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1520 may support wireless communications in accordance with examples as disclosed herein. The cell DTX/DRX activation component 1525 is capable of, configured to, or operable to support a means for identifying an energy savings configuration for a discontinuous cycle of a cell associated with the network entity, the energy savings configuration including a DTX activation state of the cell, a DRX activation state of the cell, or both for the discontinuous cycle. The control signaling component 1530 is capable of, configured to, or operable to support a means for transmitting, to a set of UEs, control signaling that indicates the energy savings configuration for the discontinuous cycle. The discontinuous mode operation component 1535 is capable of, configured to, or operable to support a means for communicating, during the discontinuous cycle, with one or more UEs of the set of UEs in accordance with the energy savings configuration.

In some examples, to support transmitting the control signaling, the control signaling component 1530 is capable of, configured to, or operable to support a means for indicating, via a DCI of a power saving monitoring procedure, the energy savings configuration for the discontinuous cycle prior to the discontinuous cycle.

In some examples, to support transmitting the control signaling, the control signaling component 1530 is capable of, configured to, or operable to support a means for transmitting, as part of the control signaling, an ES-RNTI that is associated with each UE of the set of UEs.

In some examples, the set of UEs include separate subsets of UEs, and the control signaling component 1530 is capable of, configured to, or operable to support a means for transmitting, as part of the ES-RNTI, a respective UE group indicator for each respective subset of UEs, where a given UE group indicator includes at least a timing offset for the respective subset of UEs, the timing offset indicating a duration of time after a start of the discontinuous cycle for the respective subset of UEs to wait before communicating with the cell.

In some examples, each respective UE group indicator further includes an activation status of the respective subset of UEs, a duration of the activation status, and a periodicity associated with activation of the respective subset of UEs.

In some examples, the respective subsets of UEs and the respective UE group indicators are based on the energy savings configuration.

In some examples, to support transmitting the control signaling, the control signaling component 1530 is capable of, configured to, or operable to support a means for transmitting, as part of the control signaling, an indication for the set of UEs to apply a cell DTX cycle or a cell DRX cycle for the discontinuous cycle.

In some examples, to support transmitting the control signaling, the control signaling component 1530 is capable of, configured to, or operable to support a means for transmitting, as part of the control signaling, an indication for a duration of the discontinuous cycle.

In some examples, the control signaling component 1530 is capable of, configured to, or operable to support a means for transmitting second control signaling deactivating the energy savings configuration, where the energy savings configuration is applied for the set of UEs until transmitting the second control signaling.

In some examples, to support transmitting the control signaling, the control signaling component 1530 is capable of, configured to, or operable to support a means for transmitting, as part of the control signaling, an indication of whether channel state information reporting at the set of UEs is activated or deactivated during a quantity of discontinuous cycles that includes the discontinuous cycle.

In some examples, to support transmitting the control signaling, the control signaling component 1530 is capable of, configured to, or operable to support a means for transmitting, as part of the control signaling, an indication of whether reference signal received power reporting at the set of UEs is activated or deactivated during a quantity of discontinuous cycles that includes the discontinuous cycle.

In some examples, the control signaling is DCI of format 2_6.

Additionally, or alternatively, the communications manager 1520 may support wireless communications in accordance with examples as disclosed herein. In some examples, the cell DTX/DRX activation component 1525 is capable of, configured to, or operable to support a means for identifying, at a first cell of the network entity, an energy savings configuration for a set of cells associated with the network entity, the energy savings configuration including a respective DTX activation state for one or more cells of the set of cells, a DRX activation state for the one more cells of the set of cells, or both. In some examples, the control signaling component 1530 is capable of, configured to, or operable to support a means for transmitting, to a set of UEs, control signaling that indicates the energy savings activation state for the one or more cells of the set of cells. In some examples, the discontinuous mode operation component 1535 is capable of, configured to, or operable to support a means for communicating, via the set of cells, with the one or more UEs of the set of UEs in accordance with the energy savings activation state.

In some examples, to support transmitting the control signaling, the control signaling component 1530 is capable of, configured to, or operable to support a means for transmitting, as part of the control signaling, a respective cell ID for each cell of the set of cells, where the respective DTX activation state and the respective DRX activation state for a given cell of the set of cells corresponds to the respective cell ID of the given cell.

In some examples, a system information block includes each respective cell ID, each respective DTX activation state, and each respective DRX activation state.

In some examples, the control signaling component 1530 is capable of, configured to, or operable to support a means for transmitting, to the set of UEs, one or more control messages indicating a cell bit map, where each bit of the cell bit map is associated with a DTX activation state of a given cell of the one or more cells, a DRX activation state of the given cell, or both, where the control signaling includes the cell bit map.

In some examples, to support transmitting the one or more control messages, the control signaling component 1530 is capable of, configured to, or operable to support a means for transmitting, to the set of UEs via broadcast, a RRC message indicating the cell bit map.

In some examples, to support transmitting the one or more control messages, the control signaling component 1530 is capable of, configured to, or operable to support a means for transmitting, via unicast, a respective MAC-CE message to each UE of the set of UEs, where each respective MAC-CE message includes the cell bit map.

In some examples, to support transmitting the control signaling, the control signaling component 1530 is capable of, configured to, or operable to support a means for transmitting a respective set of bits associated with each respective frequency, where a first bit for a given set of bits indicates a DTX activation state of an associated frequency, and a second bit of the given set of bits indicates a DRX activation state of the associated frequency.

In some examples, each cell of the one or more cells is associated with a respective frequency, and the control signaling component 1530 is capable of, configured to, or operable to support a means for transmitting, to the set of UEs, a RRC message indicating a frequency bit map, where each bit of the frequency bit map is associated with a DTX activation state of a given cell of the one or more cells, a DRX activation state of the given cell, or both, where the control signaling includes the frequency bit map.

In some examples, the control signaling is system information associated with the network entity.

Figure 16:
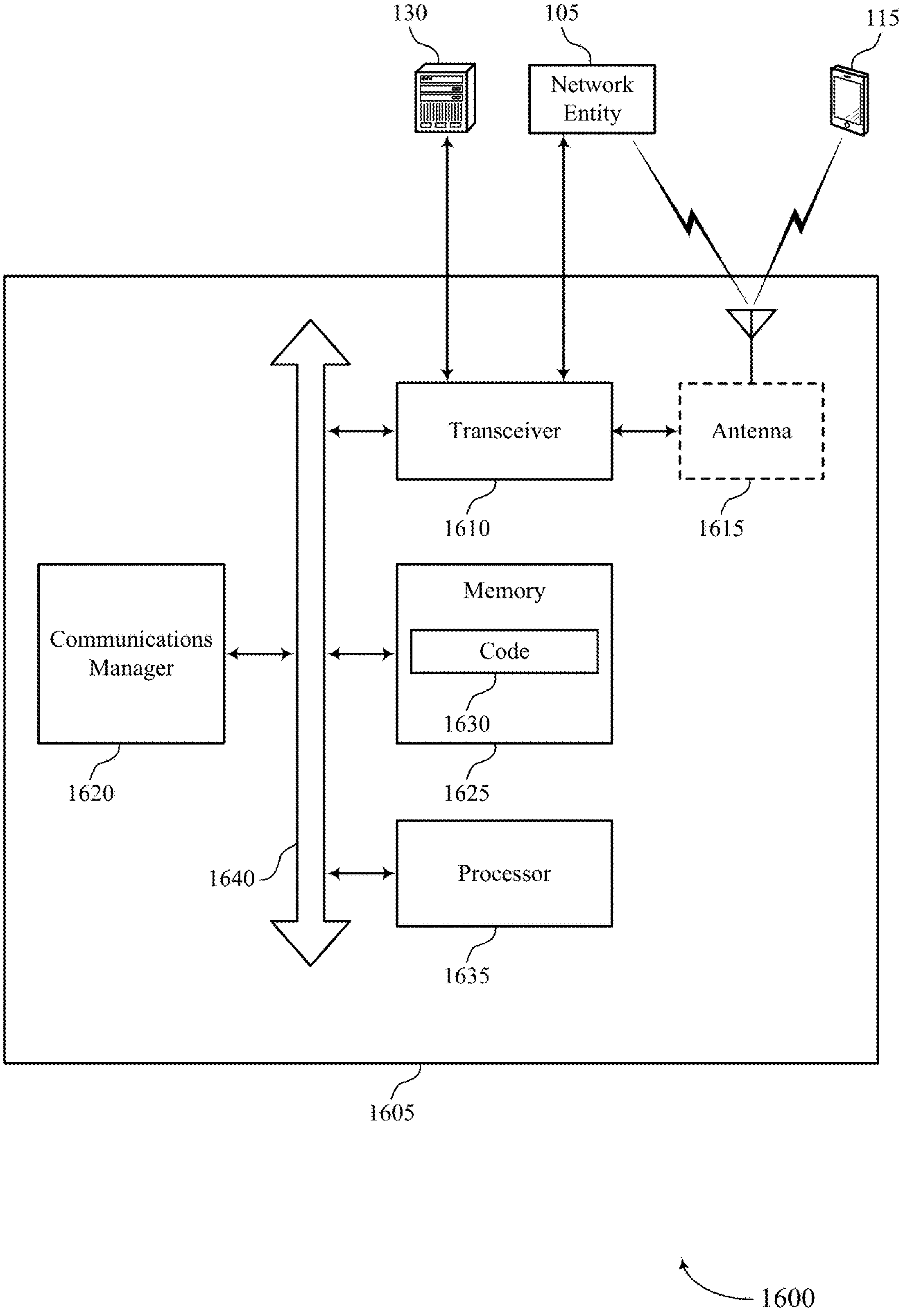
FIG. 16 shows a diagram of a system including a device that supports techniques for cell DRX and DTX state activation in accordance with one or more aspects of the present disclosure.

FIG. 16 shows a diagram of a system 1600 including a device 1605 that supports techniques for cell DRX and DTX state activation in accordance with one or more aspects of the present disclosure. The device 1605 may be an example of or include the components of a device 1305, a device 1405, or a network entity 105 as described herein. The device 1605 may communicate with one or more network entities 105, one or more UEs 115, or any combination thereof, which may include communications over one or more wired interfaces, over one or more wireless interfaces, or any combination thereof. The device 1605 may include components that support outputting and obtaining communications, such as a communications manager 1620, a transceiver 1610, an antenna 1615, a memory 1625, code 1630, and a processor 1635. These components may be in electronic communication or otherwise coupled (e.g., operatively, communicatively, functionally, electronically, electrically) via one or more buses (e.g., a bus 1640).

The transceiver 1610 may support bi-directional communications via wired links, wireless links, or both as described herein. In some examples, the transceiver 1610 may include a wired transceiver and may communicate bi-directionally with another wired transceiver. Additionally, or alternatively, in some examples, the transceiver 1610 may include a wireless transceiver and may communicate bi-directionally with another wireless transceiver. In some examples, the device 1605 may include one or more antennas 1615, which may be capable of transmitting or receiving wireless transmissions (e.g., concurrently). The transceiver 1610 may also include a modem to modulate signals, to provide the modulated signals for transmission (e.g., by one or more antennas 1615, by a wired transmitter), to receive modulated signals (e.g., from one or more antennas 1615, from a wired receiver), and to demodulate signals. In some implementations, the transceiver 1610 may include one or more interfaces, such as one or more interfaces coupled with the one or more antennas 1615 that are configured to support various receiving or obtaining operations, or one or more interfaces coupled with the one or more antennas 1615 that are configured to support various transmitting or outputting operations, or a combination thereof. In some implementations, the transceiver 1610 may include or be configured for coupling with one or more processors or one or more memory components that are operable to perform or support operations based on received or obtained information or signals, or to generate information or other signals for transmission or other outputting, or any combination thereof. In some implementations, the transceiver 1610, or the transceiver 1610 and the one or more antennas 1615, or the transceiver 1610 and the one or more antennas 1615 and one or more processors or one or more memory components (e.g., the at least one processor 1635, the at least one memory 1625, or both), may be included in a chip or chip assembly that is installed in the device 1605. In some examples, the transceiver 1610 may be operable to support communications via one or more communications links (e.g., a communication link 125, a backhaul communication link 120, a midhaul communication link 162, a fronthaul communication link 168).

The at least one memory 1625 may include RAM, ROM, or any combination thereof. The at least one memory 1625 may store computer-readable, computer-executable code 1630 including instructions that, when executed by one or more of the at least one processor 1635, cause the device 1605 to perform various functions described herein. The code 1630 may be stored in a non-transitory computer-readable medium such as system memory or another type of memory. In some cases, the code 1630 may not be directly executable by a processor of the at least one processor 1635 but may cause a computer (e.g., when compiled and executed) to perform functions described herein. In some cases, the at least one memory 1625 may contain, among other things, a BIOS which may control basic hardware or software operation such as the interaction with peripheral components or devices. In some examples, the at least one processor 1635 may include multiple processors and the at least one memory 1625 may include multiple memories.

One or more of the multiple processors may be coupled with one or more of the multiple memories which may, individually or collectively, be configured to perform various functions herein (for example, as part of a processing system).

The at least one processor 1635 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the at least one processor 1635 may be configured to operate a memory array using a memory controller. In some other cases, a memory controller may be integrated into one or more of the at least one processor 1635. The at least one processor 1635 may be configured to execute computer-readable instructions stored in a memory (e.g., one or more of the at least one memory 1625) to cause the device 1605 to perform various functions (e.g., functions or tasks supporting techniques for cell DRX and DTX state activation). For example, the device 1605 or a component of the device 1605 may include at least one processor 1635 and at least one memory 1625 coupled with one or more of the at least one processor 1635, the at least one processor 1635 and the at least one memory 1625 configured to perform various functions described herein. The at least one processor 1635 may be an example of a cloud-computing platform (e.g., one or more physical nodes and supporting software such as operating systems, virtual machines, or container instances) that may host the functions (e.g., by executing code 1630) to perform the functions of the device 1605. The at least one processor 1635 may be any one or more suitable processors capable of executing scripts or instructions of one or more software programs stored in the device 1605 (such as within one or more of the at least one memory 1625). In some implementations, the at least one processor 1635 may be a component of a processing system. A processing system may generally refer to a system or series of machines or components that receives inputs and processes the inputs to produce a set of outputs (which may be passed to other systems or components of, for example, the device 1605). For example, a processing system of the device 1605 may refer to a system including the various other components or subcomponents of the device 1605, such as the at least one processor 1635, or the transceiver 1610, or the communications manager 1620, or other components or combinations of components of the device 1605. The processing system of the device 1605 may interface with other components of the device 1605, and may process information received from other components (such as inputs or signals) or output information to other components. For example, a chip or modem of the device 1605 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1605 may transmit information output from the chip or modem. Additionally, or alternatively, in some implementations, the one or more interfaces may refer to an interface between the processing system of the chip or modem and a receiver, such that the device 1605 may obtain information or signal inputs, and the information may be passed to the processing system. A person having ordinary skill in the art will readily recognize that a first interface also may obtain information or signal inputs, and a second interface also may output information or signal outputs.

In some examples, a bus 1640 may support communications of (e.g., within) a protocol layer of a protocol stack. In some examples, a bus 1640 may support communications associated with a logical channel of a protocol stack (e.g., between protocol layers of a protocol stack), which may include communications performed within a component of the device 1605, or between different components of the device 1605 that may be co-located or located in different locations (e.g., where the device 1605 may refer to a system in which one or more of the communications manager 1620, the transceiver 1610, the at least one memory 1625, the code 1630, and the at least one processor 1635 may be located in one of the different components or divided between different components).

In some examples, the communications manager 1620 may manage aspects of communications with a core network 130 (e.g., via one or more wired or wireless backhaul links). For example, the communications manager 1620 may manage the transfer of data communications for client devices, such as one or more UEs 115. In some examples, the communications manager 1620 may manage communications with other network entities 105, and may include a controller or scheduler for controlling communications with UEs 115 in cooperation with other network entities 105. In some examples, the communications manager 1620 may support an X2 interface within an LTE/LTE-A wireless communications network technology to provide communication between network entities 105.

The communications manager 1620 may support wireless communications in accordance with examples as disclosed herein. For example, the communications manager 1620 is capable of, configured to, or operable to support a means for identifying an energy savings configuration for a discontinuous cycle of a cell associated with the network entity, the energy savings configuration including a DTX activation state of the cell, a DRX activation state of the cell, or both for the discontinuous cycle. The communications manager 1620 is capable of, configured to, or operable to support a means for transmitting, to a set of UEs, control signaling that indicates the energy savings configuration for the discontinuous cycle. The communications manager 1620 is capable of, configured to, or operable to support a means for communicating, during the discontinuous cycle, with one or more UEs of the set of UEs in accordance with the energy savings configuration.

Additionally, or alternatively, the communications manager 1620 may support wireless communications in accordance with examples as disclosed herein. For example, the communications manager 1620 is capable of, configured to, or operable to support a means for identifying, at a first cell of the network entity, an energy savings configuration for a set of cells associated with the network entity, the energy savings configuration including a respective DTX activation state for one or more cells of the set of cells, a DRX activation state for the one more cells of the set of cells, or both. The communications manager 1620 is capable of, configured to, or operable to support a means for transmitting, to a set of UEs, control signaling that indicates the energy savings activation state for the one or more cells of the set of cells. The communications manager 1620 is capable of, configured to, or operable to support a means for communicating, via the set of cells, with the one or more UEs of the set of UEs in accordance with the energy savings activation state.

By including or configuring the communications manager 1620 in accordance with examples as described herein, the device 1605 may support techniques for cell DTX/DRX activation and deactivation which may result in improved communication reliability, reduced latency, improved user experience related to reduced processing, reduced power consumption, more efficient utilization of communication resources, improved coordination between devices, longer battery life, and improved utilization of processing capability.

In some examples, the communications manager 1620 may be configured to perform various operations (e.g., receiving, obtaining, monitoring, outputting, transmitting) using or otherwise in cooperation with the transceiver 1610, the one or more antennas 1615 (e.g., where applicable), or any combination thereof. Although the communications manager 1620 is illustrated as a separate component, in some examples, one or more functions described with reference to the communications manager 1620 may be supported by or performed by the transceiver 1610, one or more of the at least one processor 1635, one or more of the at least one memory 1625, the code 1630, or any combination thereof (for example, by a processing system including at least a portion of the at least one processor 1635, the at least one memory 1625, the code 1630, or any combination thereof). For example, the code 1630 may include instructions executable by one or more of the at least one processor 1635 to cause the device 1605 to perform various aspects of techniques for cell DRX and DTX state activation as described herein, or the at least one processor 1635 and the at least one memory 1625 may be otherwise configured to, individually or collectively, perform or support such operations.

Figure 17:
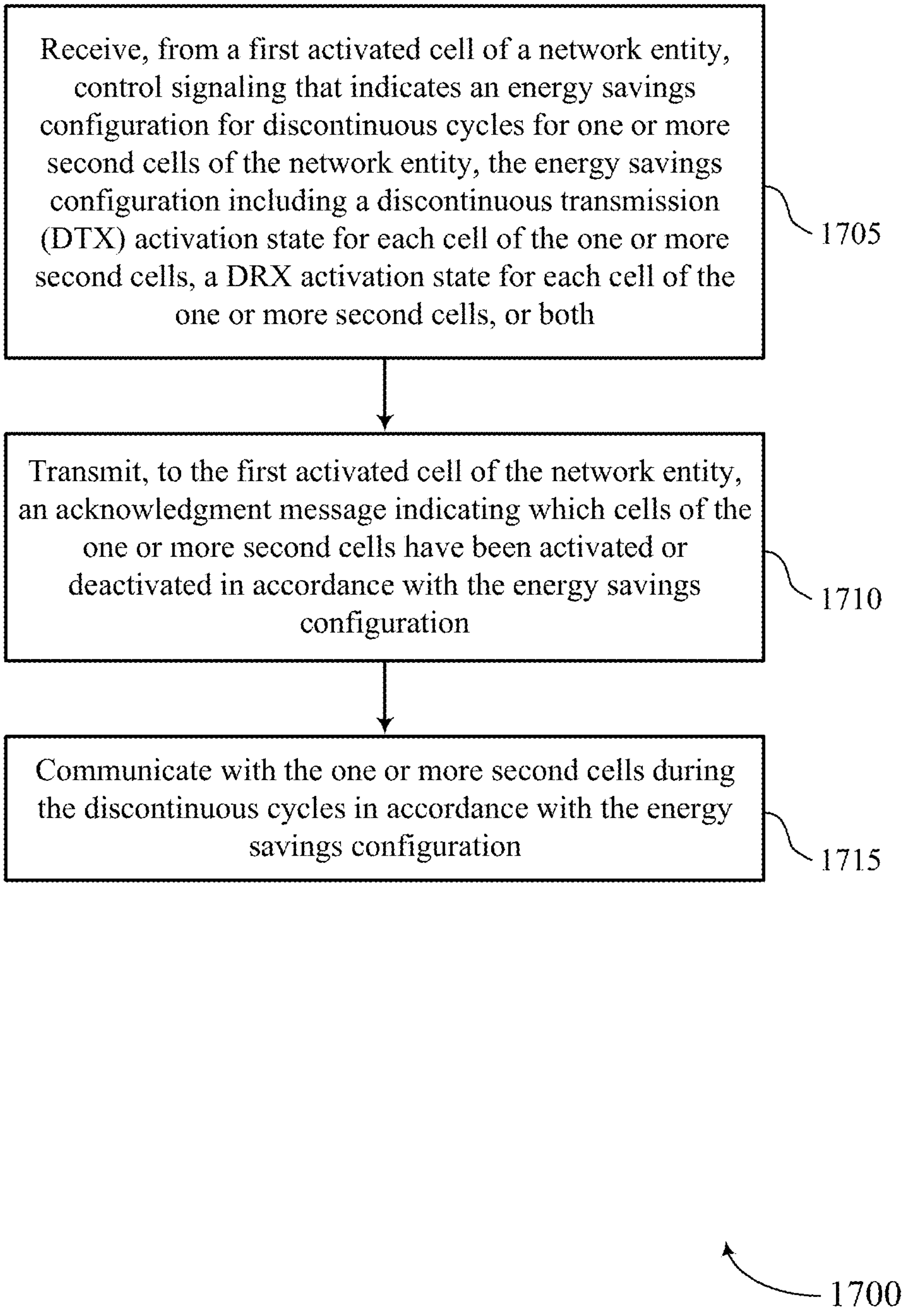
FIGS. 17 through 19 show flowcharts illustrating methods that support techniques for cell DRX and DTX state activation in accordance with one or more aspects of the present disclosure.

FIG. 17 shows a flowchart illustrating a method 1700 that supports techniques for cell DRX and DTX state activation in accordance with aspects of the present disclosure. The operations of the method 1700 may be implemented by a UE or its components as described herein. For example, the operations of the method 1700 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 1705, the method may include receiving, from a first activated cell of a network entity, control signaling that indicates an energy savings configuration for discontinuous cycles for one or more second cells of the network entity, the energy savings configuration including a DTX activation state for each cell of the one or more second cells, a DRX activation state for each cell of the one or more second cells, or both. The operations of block 1705 may be performed in accordance with examples as disclosed herein. In some examples, aspects of the operations of 1705 may be performed by a control signal monitoring component 1125 as described with reference to FIG. 11.

At 1710, the method may include transmitting, to the first activated cell of the network entity, an acknowledgment message indicating which cells of the one or more second cells have been activated or deactivated in accordance with the energy savings configuration. The operations of block 1710 may be performed in accordance with examples as disclosed herein. In some examples, aspects of the operations of 1710 may be performed by an ACK messaging component 1130 as described with reference to FIG. 11.

At 1715, the method may include communicating with the one or more second cells during the discontinuous cycles in accordance with the energy savings configuration. The operations of block 1715 may be performed in accordance with examples as disclosed herein. In some examples, aspects of the operations of 1715 may be performed by a discontinuous mode operation component 1135 as described with reference to FIG. 11.

Figure 18:
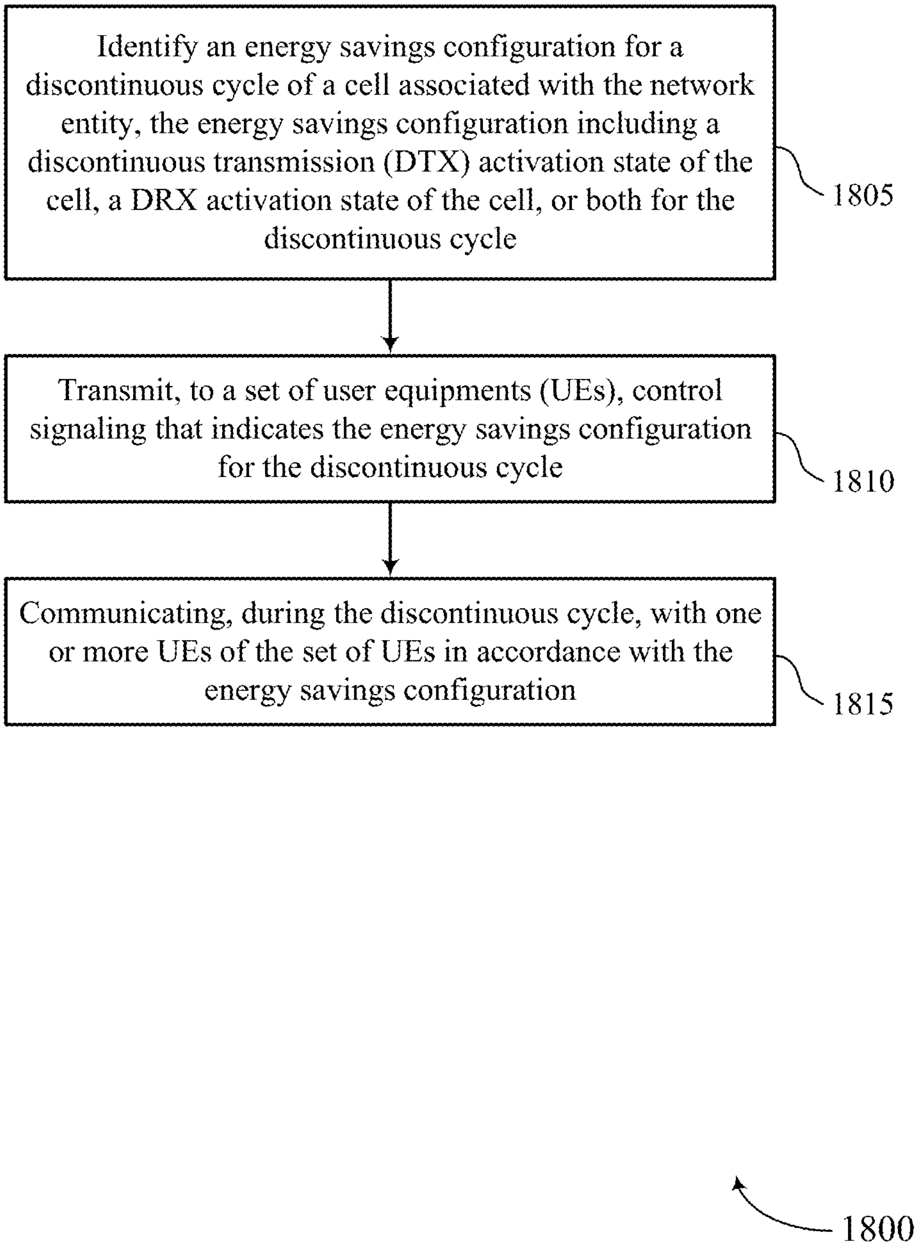

FIG. 18 shows a flowchart illustrating a method 1800 that supports techniques for cell DRX and DTX state activation in accordance with aspects of the present disclosure. The operations of the method 1800 may be implemented by a network entity or its components as described herein. For example, the operations of the method 1800 may be performed by a network entity as described with reference to FIGS. 1 through 8 and 13 through 16. In some examples, a network entity may execute a set of instructions to control the functional elements of the network entity to perform the described functions. Additionally, or alternatively, the network entity may perform aspects of the described functions using special-purpose hardware.

At 1805, the method may include identifying an energy savings configuration for a discontinuous cycle of a cell associated with the network entity, the energy savings configuration including a DTX activation state of the cell, a DRX activation state of the cell, or both for the discontinuous cycle. The operations of block 1805 may be performed in accordance with examples as disclosed herein. In some examples, aspects of the operations of 1805 may be performed by a cell DTX/DRX activation component 1525 as described with reference to FIG. 15.

At 1810, the method may include transmitting, to a set of UEs, control signaling that indicates the energy savings configuration for the discontinuous cycle. The operations of block 1810 may be performed in accordance with examples as disclosed herein. In some examples, aspects of the operations of 1810 may be performed by a control signaling component 1530 as described with reference to FIG. 15.

At 1815, the method may include communicating, during the discontinuous cycle, with one or more UEs of the set of UEs in accordance with the energy savings configuration. The operations of block 1815 may be performed in accordance with examples as disclosed herein. In some examples, aspects of the operations of 1815 may be performed by a discontinuous mode operation component 1535 as described with reference to FIG. 15.

Figure 19:
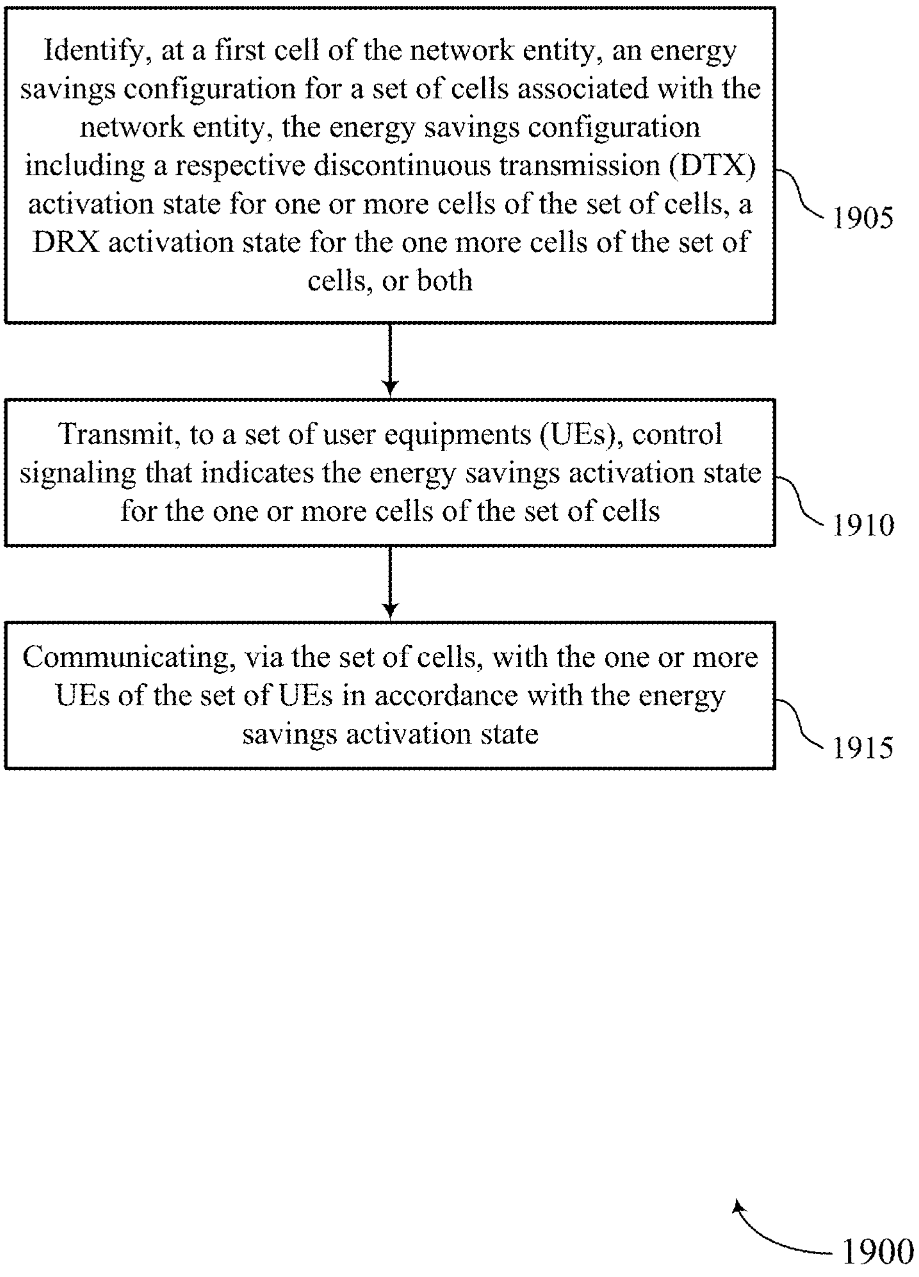

FIG. 19 shows a flowchart illustrating a method 1900 that supports techniques for cell DRX and DTX state activation in accordance with aspects of the present disclosure. The operations of the method 1900 may be implemented by a network entity or its components as described herein. For example, the operations of the method 1900 may be performed by a network entity as described with reference to FIGS. 1 through 8 and 13 through 16. In some examples, a network entity may execute a set of instructions to control the functional elements of the network entity to perform the described functions. Additionally, or alternatively, the network entity may perform aspects of the described functions using special-purpose hardware.

At 1905, the method may include identifying, at a first cell of the network entity, an energy savings configuration for a set of cells associated with the network entity, the energy savings configuration including a respective DTX activation state for one or more cells of the set of cells, a DRX activation state for the one more cells of the set of cells, or both. The operations of block 1905 may be performed in accordance with examples as disclosed herein. In some examples, aspects of the operations of 1905 may be performed by a cell DTX/DRX activation component 1525 as described with reference to FIG. 15.

At 1910, the method may include transmitting, to a set of UEs, control signaling that indicates the energy savings activation state for the one or more cells of the set of cells. The operations of block 1910 may be performed in accordance with examples as disclosed herein. In some examples, aspects of the operations of 1910 may be performed by a control signaling component 1530 as described with reference to FIG. 15.

At 1915, the method may include communicating, via the set of cells, with the one or more UEs of the set of UEs in accordance with the energy savings activation state. The operations of block 1915 may be performed in accordance with examples as disclosed herein. In some examples, aspects of the operations of 1915 may be performed by a discontinuous mode operation component 1535 as described with reference to FIG. 15.

The following provides an overview of aspects of the present disclosure:

Aspect 1: A method for wireless communications, at a UE comprising: receiving, from a first activated cell of a network entity, control signaling that indicates an energy savings configuration for discontinuous cycles for one or more second cells of the network entity, the energy savings configuration including a DTX activation state for each cell of the one or more second cells, a DRX activation state for each cell of the one or more second cells, or both; transmitting, to the first activated cell of the network entity, an acknowledgment message indicating which cells of the one or more second cells have been activated or deactivated in accordance with the energy savings configuration; and communicating with the one or more second cells during the discontinuous cycles in accordance with the energy savings configuration.

Aspect 2: The method of aspect 1, wherein the acknowledgment message comprises a HARQ, and a process number of the HARQ indicates which cells of the one or more second cells have been activated or deactivated in accordance with the energy savings configuration.

Aspect 3: The method of any of aspects 1 through 2, wherein transmitting the acknowledgment message comprises transmitting, as part of the acknowledgment message, a MAC-CE comprising a cell map that indicates which cells of the one or more second cells have been activated or deactivated in accordance with the energy savings configuration.

Aspect 4: The method of aspect 3, further comprising: receiving, from the first activated cell, a request to transmit the MAC-CE comprising the cell map, wherein transmitting the MAC-CE comprising the cell map that indicates which cells of the one or more second cells have been activated or deactivated is based at least in part on receiving the request.

Aspect 5: A method for wireless communications, at a network entity, comprising: identifying an energy savings configuration for a discontinuous cycle of a cell associated with the network entity, the energy savings configuration comprising a DTX activation state of the cell, a DRX activation state of the cell, or both for the discontinuous cycle; transmitting, to a set of UEs, control signaling that indicates the energy savings configuration for the discontinuous cycle; and communicating, during the discontinuous cycle, with one or more UEs of the set of UEs in accordance with the energy savings configuration.

Aspect 6: The method of aspect 5, wherein transmitting the control signaling comprises: indicating, via a DCI of a power saving monitoring procedure, the energy savings configuration for the discontinuous cycle prior to the discontinuous cycle.

Aspect 7: The method of any of aspects 5 through 6, wherein transmitting the control signaling comprises: transmitting, as part of the control signaling, an ES-RNTI that is associated with each UE of the set of UEs.

Aspect 8: The method of aspect 7, wherein the set of UEs comprise separate subsets of UEs, the method further comprising: transmitting, as part of the ES-RNTI, a respective UE group indicator for each respective subset of UEs, wherein a given UE group indicator comprises at least a timing offset for the respective subset of UEs, the timing offset indicating a duration of time after a start of the discontinuous cycle for the respective subset of UEs to wait before communicating with the cell.

Aspect 9: The method of aspect 8, wherein each respective UE group indicator further comprises an activation status of the respective subset of UEs, a duration of the activation status, and a periodicity associated with activation of the respective subset of UEs.

Aspect 10: The method of any of aspects 8 through 9, wherein the respective subsets of UEs and the respective UE group indicators are based at least in part on the energy savings configuration.

Aspect 11: The method of any of aspects 5 through 10, wherein transmitting the control signaling comprises: transmitting, as part of the control signaling, an indication for the set of UEs to apply a cell DTX cycle or a cell DRX cycle for the discontinuous cycle.

Aspect 12: The method of any of aspects 5 through 11, wherein transmitting the control signaling comprises: transmitting, as part of the control signaling, an indication for a duration of the discontinuous cycle.

Aspect 13: The method of any of aspects 5 through 12, further comprising: transmitting second control signaling deactivating the energy savings configuration, wherein the energy savings configuration is applied for the set of UEs until transmitting the second control signaling.

Aspect 14: The method of any of aspects 5 through 13, wherein transmitting the control signaling comprises: transmitting, as part of the control signaling, an indication of whether channel state information reporting at the set of UEs is activated or deactivated during a quantity of discontinuous cycles that includes the discontinuous cycle.

Aspect 15: The method of any of aspects 5 through 14, wherein transmitting the control signaling comprises: transmitting, as part of the control signaling, an indication of whether reference signal received power reporting at the set of UEs is activated or deactivated during a quantity of discontinuous cycles that includes the discontinuous cycle.

Aspect 16: The method of any of aspects 5 through 15, wherein the control signaling is DCI of format 2_6.

Aspect 17: A method for wireless communications, at a network entity, comprising: identifying, at a first cell of the network entity, an energy savings configuration for a set of cells associated with the network entity, the energy savings configuration comprising a respective DTX activation state for one or more cells of the set of cells, a DRX activation state for the one more cells of the set of cells, or both; transmitting, to a set of UEs, control signaling that indicates an energy savings activation state for the one or more cells of the set of cells based at least in part on the energy savings configuration; and communicating, via the set of cells, with one or more UEs of the set of UEs in accordance with the energy savings activation state.

Aspect 18: The method of aspect 17, wherein transmitting the control signaling comprises: transmitting, as part of the control signaling, a respective cell ID for each cell of the set of cells, wherein the respective DTX activation state and the respective DRX activation state for a given cell of the set of cells corresponds to the respective cell ID of the given cell.

Aspect 19: The method of aspect 18, wherein a system information block comprises each respective cell ID, each respective DTX activation state, and each respective DRX activation state.

Aspect 20: The method of any of aspects 17 through 19, further comprising: transmitting, to the set of UEs, one or more control messages indicating a cell bit map, wherein each bit of the cell bit map is associated with a DTX activation state of a given cell of the one or more cells, a DRX activation state of the given cell, or both, wherein the control signaling comprises the cell bit map.

Aspect 21: The method of aspect 20, wherein transmitting the one or more control messages comprises: transmitting, to the set of UEs via broadcast, a RRC message indicating the cell bit map.

Aspect 22: The method of any of aspects 20 through 21, wherein transmitting the one or more control messages comprises: transmitting, via unicast, a respective MAC-CE message to each UE of the set of UEs, where each respective MAC-CE message comprises the cell bit map.

Aspect 23: The method of any of aspects 17 through 22, wherein each cell of the one or more cells is associated with a respective frequency, wherein transmitting the control signaling comprises: transmitting a respective set of bits associated with each respective frequency, wherein a first bit for a given set of bits indicates a DTX activation state of an associated frequency, and a second bit of the given set of bits indicates a DRX activation state of the associated frequency.

Aspect 24: The method of any of aspects 17 through 23, wherein each cell of the one or more cells is associated with a respective frequency, the method further comprising: transmitting, to the set of UEs, a RRC message indicating a frequency bit map, wherein each bit of the frequency bit map is associated with a DTX activation state of a given cell of the one or more cells, a DRX activation state of the given cell, or both, wherein the control signaling comprises the frequency bit map.

Aspect 25: The method of any of aspects 17 through 24, wherein the control signaling is system information associated with the network entity.

Aspect 26: An apparatus for wireless communications, comprising at least one processor; at least one memory coupled with the at least one processor; and instructions stored in the at least one memory and executable by the at least one processor to cause the apparatus to perform a method of any of aspects 1 through 4.

Aspect 27: An apparatus for wireless communications, comprising at least one means for performing a method of any of aspects 1 through 4.

Aspect 28: A non-transitory computer-readable medium storing code for wireless communications, the code comprising instructions executable by a processor to perform a method of any of aspects 1 through 4.

Aspect 29: An apparatus for wireless communications, comprising at least one processor; at least one memory coupled with the at least one processor; and instructions stored in the at least one memory and executable by the at least one processor to cause the apparatus to perform a method of any of aspects 5 through 16.

Aspect 30: An apparatus for wireless communications, comprising at least one means for performing a method of any of aspects 5 through 16.

Aspect 31: A non-transitory computer-readable medium storing code for wireless communications, the code comprising instructions executable by a processor to perform a method of any of aspects 5 through 16.

Aspect 32: An apparatus for wireless communications, comprising at least one processor; at least one memory coupled with the at least one processor; and instructions stored in the at least one memory and executable by the at least one processor to cause the apparatus to perform a method of any of aspects 17 through 25.

Aspect 33: An apparatus for wireless communications, comprising at least one means for performing a method of any of aspects 17 through 25.

Aspect 34: A non-transitory computer-readable medium storing code for wireless communications, the code comprising instructions executable by a processor to perform a method of any of aspects 17 through 25.

Aspect 35: A method for wireless communications, at a UE, comprising: identifying an energy savings configuration for a discontinuous cycle of a cell associated with a network entity, the energy savings configuration comprising a DTX activation state of the cell, a DRX activation state of the cell, or both for the discontinuous cycle; receiving, from the network entity, control signaling that indicates the energy savings configuration for the discontinuous cycle for a set of UEs comprising the UE; and communicating, during the discontinuous cycle, with the network entity in accordance with the energy savings configuration.

Aspect 36: The method of aspect 35, wherein receiving the control signaling comprises: receiving, via a downlink control information of a power saving monitoring procedure, the energy savings configuration for the discontinuous cycle prior to the discontinuous cycle.

Aspect 37: The method of any of aspects 35 through 36, wherein receiving the control signaling comprises: receiving, as part of the control signaling, an energy saving radio network temporary identifier that is associated with the UE of the set of UEs.

Aspect 38: The method of aspect 37, wherein the set of UEs comprises a subset of UEs comprising the UE, the method further comprising: receiving, as part of the energy saving radio network temporary identifier, a UE group indicator for the subset of UEs, wherein the UE group indicator comprises at least a timing offset for the subset of UEs, the timing offset indicating a duration of time after a start of the discontinuous cycle for the subset of UEs to wait before communicating with the cell.

Aspect 39: The method of aspect 38, wherein the UE group indicator further comprises an activation status of the subset of UEs, a duration of the activation status, and a periodicity associated with activation of the subset of UEs.

Aspect 40: The method of any of aspects 38 through 39, wherein the subset of UE and the UE group indicator are based at least in part on the energy savings configuration.

Aspect 41: The method of any of aspects 35 through 40, wherein receiving the control signaling comprises: receiving, as part of the control signaling, an indication for the set of UEs to apply a cell DTX cycle or a cell DRX cycle for the discontinuous cycle.

Aspect 42: The method of any of aspects 35 through 41, wherein transmitting the control signaling comprises: receiving, as part of the control signaling, an indication for a duration of the discontinuous cycle.

Aspect 43: The method of any of aspects 35 through 42, further comprising: receiving second control signaling deactivating the energy savings configuration, wherein the energy savings configuration is applied for the set of UEs until receiving the second control signaling.

Aspect 44: The method of any of aspects 35 through 43, wherein receiving the control signaling comprises: receiving, as part of the control signaling, an indication of whether channel state information reporting at the set of UEs is activated or deactivated during a quantity of discontinuous cycles that includes the discontinuous cycle.

Aspect 45: The method of any of aspects 35 through 44, wherein receiving the control signaling comprises: receiving, as part of the control signaling, an indication of whether reference signal received power reporting at the set of UEs is activated or deactivated during a quantity of discontinuous cycles that includes the discontinuous cycle.

Aspect 46: The method of any of aspects 35 through 45, wherein the control signaling is downlink control information.

Aspect 47: A method for wireless communications, at a UE, comprising: identifying an energy savings configuration for a set of cells associated with a network entity, the energy savings configuration comprising a respective DTX activation state for one or more cells of the set of cells, a DRX activation state for the one or more cells of the set of cells, or both; receiving, from the network entity, control signaling that indicates an energy savings activation state for the one or more cells of the set of cells based at least in part on the energy savings configuration; and communicating, via the set of cells, with the network entity in accordance with the energy savings activation state.

Aspect 48: The method of aspect 47, wherein receiving the control signaling comprises: receiving, as part of the control signaling, a respective cell ID for each cell of the set of cells, wherein the respective DTX activation state and the respective DRX activation state for a given cell of the set of cells corresponds to the respective cell ID of the given cell.

Aspect 49: The method of aspect 48, wherein a system information block comprises each respective cell ID, each respective DTX activation state, and each respective DRX activation state.

Aspect 50: The method of any of aspects 47 through 49, further comprising: receiving one or more control messages indicating a cell bit map, wherein each bit of the cell bit map is associated with a DTX activation state of a given cell of the one or more cells, a DRX activation state of the given cell, or both, wherein the control signaling comprises the cell bit map.

Aspect 51: The method of aspect 50, wherein receiving the one or more control messages comprises: receiving, via broadcast, a radio resource control message indicating the cell bit map.

Aspect 52: The method of any of aspects 50 through 51, wherein receiving the one or more control messages comprises: receiving, via unicast, a medium access control-control element message, wherein the medium access control-control element message comprises the cell bit map.

Aspect 53: The method of any of aspects 47 through 52, wherein each cell of the one or more cells is associated with a respective frequency, wherein receiving the control signaling comprises: receiving a respective set of bits associated with each respective frequency, wherein a first bit for a given set of bits indicates a DTX activation state of an associated frequency, and a second bit of the given set of bits indicates a DRX activation state of the associated frequency.

Aspect 54: The method of any of aspects 47 through 53, wherein each cell of the one or more cells is associated with a respective frequency, the method further comprising: receiving a radio resource control message indicating a frequency bit map, wherein each bit of the frequency bit map is associated with a DTX activation state of a given cell of the one or more cells, a DRX activation state of the given cell, or both, wherein the control signaling comprises the frequency bit map.

Aspect 55: The method of any of aspects 47 through 54, wherein the control signaling is system information associated with the network entity.

Aspect 56: A UE for wireless communications, comprising one or more memories storing processor-executable code, and one or more processors coupled with the one or more memories and individually or collectively operable to execute the code to cause the UE to perform a method of any of aspects 35 through 46.

Aspect 57: A UE for wireless communications, comprising at least one means for performing a method of any of aspects 35 through 46.

Aspect 58: A non-transitory computer-readable medium storing code for wireless communications, the code comprising instructions executable by one or more processors to perform a method of any of aspects 35 through 46.

Aspect 59: A UE for wireless communications, comprising one or more memories storing processor-executable code, and one or more processors coupled with the one or more memories and individually or collectively operable to execute the code to cause the UE to perform a method of any of aspects 47 through 55.

Aspect 60: A UE for wireless communications, comprising at least one means for performing a method of any of aspects 47 through 55.

Aspect 61: A non-transitory computer-readable medium storing code for wireless communications, the code comprising instructions executable by one or more processors to perform a method of any of aspects 47 through 55.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database, or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A network entity, comprising:

one or more memories storing processor-executable code; and one or more processors coupled with the one or more memories and individually or collectively operable to execute the code to cause the network entity to:

identify an energy savings configuration for a discontinuous cycle of a cell associated with the network entity, the energy savings configuration comprising a discontinuous transmission (DTX) activation state of the cell, a discontinuous reception (DRX) activation state of the cell, or both for the discontinuous cycle;

transmit, to a set of user equipments (UEs), control signaling that indicates the energy savings configuration for the discontinuous cycle; and communicate, during the discontinuous cycle, with one or more UEs of the set of UEs in accordance with the energy savings configuration.

2. The network entity of claim 1, wherein, to transmit the control signaling, the one or more processors are individually or collectively operable to execute the code to cause the network entity to:

indicate, via a downlink control information of a power saving monitoring procedure, the energy savings configuration for the discontinuous cycle prior to the discontinuous cycle.

3. The network entity of claim 1, wherein, to transmit the control signaling, the one or more processors are individually or collectively operable to execute the code to cause the network entity to:

transmit, as part of the control signaling, an energy saving radio network temporary identifier that is associated with each UE of the set of UEs.

4. The network entity of claim 3, wherein the set of UEs comprises separate subsets of UEs, and the one or more processors are individually or collectively further operable to execute the code to cause the network entity to:

transmit, as part of the energy saving radio network temporary identifier, a respective UE group indicator for each respective subset of UEs, wherein a given UE group indicator comprises at least a timing offset for the respective subset of UEs, the timing offset indicating a duration of time after a start of the discontinuous cycle for the respective subset of UEs to wait before communicating with the cell.

5. The network entity of claim 4, wherein each respective UE group indicator further comprises an activation status of the respective subset of UEs, a duration of the activation status, and a periodicity associated with activation of the respective subset of UEs.

6. The network entity of claim 4, wherein the respective subsets of UEs and the respective UE group indicators are based at least in part on the energy savings configuration.

7. The network entity of claim 1, wherein the control signaling is downlink control information.

8. A network entity, comprising:

one or more memories storing processor-executable code; and one or more processors coupled with the one or more memories and individually or collectively operable to execute the code to cause the network entity to:

identify, at a first cell of the network entity, an energy savings configuration for a set of cells associated with the network entity, the energy savings configuration comprising a respective discontinuous transmission (DTX) activation state for one or more cells of the set of cells, a discontinuous reception (DRX) activation state for the one or more cells of the set of cells, or both;

transmit, to a set of user equipments (UEs), control signaling that indicates an energy savings activation state for the one or more cells of the set of cells based at least in part on the energy savings configuration; and communicate, via the set of cells, with one or more UEs of the set of UEs in accordance with the energy savings activation state.

9. The network entity of claim 8, wherein, to transmit the control signaling, the one or more processors are individually or collectively operable to execute the code to cause the network entity to:

transmit, as part of the control signaling, a respective indication for each cell of the set of cells, wherein the respective DTX activation state and the respective DRX activation state for a given cell of the set of cells corresponds to the respective indication of the given cell.

10. The network entity of claim 9, wherein the control signaling is provided in one or more downlink control information transmissions that indicate, for each cell of the set of cells, each respective DTX activation state, and each respective DRX activation state.

11. The network entity of claim 8, wherein the one or more processors are individually or collectively further operable to execute the code to cause the network entity to:

transmit, to the set of UEs, one or more control messages indicating a set of bits, wherein each bit of the set of bits is associated with a DTX activation state of a given cell of the one or more cells, a DRX activation state of the given cell, or both, wherein the control signaling comprises the set of bits.

12. The network entity of claim 11, wherein, to transmit the one or more control messages, the one or more processors are individually or collectively operable to execute the code to cause the network entity to:

transmit, to the set of UEs via broadcast, a radio resource control message indicating the set of bits.

13. The network entity of claim 11, wherein, to transmit the one or more control messages, the one or more processors are individually or collectively operable to execute the code to cause the network entity to:

transmit, via unicast, a respective medium access control-control element message to each UE of the set of UEs, wherein each respective medium access control-control element message comprises the set of bits.

14. The network entity of claim 8, wherein, to transmit the control signaling, the one or more processors are individually or collectively operable to execute the code to cause the network entity to:

transmit a respective set of bits associated with each respective frequency, wherein a first bit for a given set of bits indicates a DTX activation state of an associated frequency, and a second bit of the given set of bits indicates a DRX activation state of the associated frequency.

15. The network entity of claim 8, wherein each cell of the one or more cells is associated with a respective frequency, and the one or more processors are individually or collectively further operable to execute the code to cause the network entity to:

transmit, to the set of UEs, a radio resource control message indicating a frequency bit map, wherein each bit of the frequency bit map is associated with a DTX activation state of a given cell of the one or more cells, a DRX activation state of the given cell, or both, wherein the control signaling comprises the frequency bit map.

16. A user equipment (UE), comprising:

one or more memories storing processor-executable code; and one or more processors coupled with the one or more memories and individually or collectively operable to execute the code to cause the UE to:

identify an energy savings configuration for a discontinuous cycle of a cell associated with a network entity, the energy savings configuration comprising a discontinuous transmission (DTX) activation state of the cell, a discontinuous reception (DRX) activation state of the cell, or both for the discontinuous cycle;

receive, from the network entity, control signaling that indicates the energy savings configuration for the discontinuous cycle for a set of UEs comprising the UE; and communicate, during the discontinuous cycle, with the network entity in accordance with the energy savings configuration.

17. The UE of claim 16, wherein, to receive the control signaling, the one or more processors are individually or collectively operable to execute the code to cause the UE to:

receive, via a downlink control information of a power saving monitoring procedure, the energy savings configuration for the discontinuous cycle prior to the discontinuous cycle.

18. The UE of claim 16, wherein, to receive the control signaling, the one or more processors are individually or collectively operable to execute the code to cause the UE to:

receive, as part of the control signaling, an energy saving radio network temporary identifier that is associated with the UE of the set of UEs.

19. The UE of claim 18, wherein the set of UEs comprises a subset of UEs comprising the UE, and the one or more processors are individually or collectively further operable to execute the code to cause the UE to:

receive, as part of the energy saving radio network temporary identifier, a UE group indicator for the subset of UEs, wherein the UE group indicator comprises at least a timing offset for the subset of UEs, the timing offset indicating a duration of time after a start of the discontinuous cycle for the subset of UEs to wait before communicating with the cell.

20. The UE of claim 19, wherein the UE group indicator further comprises an activation status of the subset of UEs, a duration of the activation status, and a periodicity associated with activation of the subset of UEs.

21. The UE of claim 19, wherein the subset of UEs and the UE group indicator are based at least in part on the energy savings configuration.

22. The UE of claim 16, wherein the control signaling is downlink control information.

23. A user equipment (UE), comprising:

one or more memories storing processor-executable code; and one or more processors coupled with the one or more memories and individually or collectively operable to execute the code to cause the UE to:

identify an energy savings configuration for a set of cells associated with a network entity, the energy savings configuration comprising a respective discontinuous transmission (DTX) activation state for one or more cells of the set of cells, a discontinuous reception (DRX) activation state for the one or more cells of the set of cells, or both;

receive, from the network entity, control signaling that indicates an energy savings activation state for the one or more cells of the set of cells based at least in part on the energy savings configuration; and communicate, via the set of cells, with the network entity in accordance with the energy savings activation state.

24. The UE of claim 23, wherein, to receive the control signaling, the one or more processors are individually or collectively operable to execute the code to cause the UE to:

receive, as part of the control signaling, a respective indication for each cell of the set of cells, wherein the respective DTX activation state and the respective DRX activation state for a given cell of the set of cells corresponds to the respective indication of the given cell.

25. The UE of claim 24, wherein the control signaling is provided in one or more downlink control information transmissions that indicate, for each cell of the set of cells, each respective DTX activation state, and each respective DRX activation state.

26. The UE of claim 23, wherein the one or more processors are individually or collectively further operable to execute the code to cause the UE to:

receive one or more control messages indicating a set of bits, wherein each bit of the set of bits is associated with a DTX activation state of a given cell of the one or more cells, a DRX activation state of the given cell, or both, wherein the control signaling comprises the set of bits.

27. The UE of claim 26, wherein, to receive the one or more control messages, the one or more processors are individually or collectively operable to execute the code to cause the UE to:

receive, via broadcast, a radio resource control message indicating the set of bits.

28. The UE of claim 26, wherein, to receive the one or more control messages, the one or more processors are individually or collectively operable to execute the code to cause the UE to:

receive, via unicast, a medium access control-control element message, wherein the medium access control-control element message comprises the set of bits.

29. The UE of claim 23, wherein, to receive the control signaling, the one or more processors are individually or collectively operable to execute the code to cause the UE to:

receive a respective set of bits associated with each respective frequency, wherein a first bit for a given set of bits indicates a DTX activation state of an associated frequency, and a second bit of the given set of bits indicates a DRX activation state of the associated frequency.

30. The UE of claim 23, wherein each cell of the one or more cells is associated with a respective frequency, and the one or more processors are individually or collectively further operable to execute the code to cause the UE to:

receive a radio resource control message indicating a frequency bit map, wherein each bit of the frequency bit map is associated with a DTX activation state of a given cell of the one or more cells, a DRX activation state of the given cell, or both, wherein the control signaling comprises the frequency bit map.

* * * * *